US012585284B2

(12) United States Patent (10) Patent No.: US 12,585,284 B2
Williams (45) Date of Patent: Mar. 24, 2026

(54) AUTONOMOUS DEVICES AND METHODS OF USE

(71) Applicant: Navico, Inc., Tulsa, OK (US)

(72) Inventor: David D. Williams, Claremore, OK (US)

(73) Assignee: Navico, Inc., Tulsa, OK (US)

( * ) Notice: Subject to any disclaimer, the term of this patent is extended or adjusted under 35 U.S.C. 154(b) by 161 days.

(21) Appl. No.: 18/531,020

(22) Filed: Dec. 6, 2023

(65) Prior Publication Data

US 2025/0189964 A1 Jun. 12, 2025

(51) Int. Cl.
 *G05D 1/224* (2024.01)
 *G01S 15/89* (2006.01)
 (Continued)

(52) U.S. Cl.
 CPC ............ *G05D 1/2246* (2024.01); *G01S 15/89* (2013.01); *G05D 1/606* (2024.01); *G06F 16/587* (2019.01);
 (Continued)

(58) Field of Classification Search
 CPC ....... G05D 1/606; G05D 1/0692; H04W 4/90; G01S 7/629; G01S 15/02; G01S 7/539;
 (Continued)

(56) References Cited

U.S. PATENT DOCUMENTS 4,425,635 A 1/1984 Yanamoto et al.
6,520,105 B2 2/2003 Koda et al.
 (Continued)

FOREIGN PATENT DOCUMENTS

CN 109856638 A * 6/2019 ............. G01S 15/02
CN 115396834 A * 11/2022 ............. H04W 4/90
 (Continued)

OTHER PUBLICATIONS

AguaDrone—The World's First Drone with a Fish Finder! website visited Oct. 25, 2016 (10 pgs.) https://www.aguadrone.com/.
 (Continued)

*Primary Examiner* — Yuri Kan
(74) *Attorney, Agent, or Firm* — Nelson Mullins Riley & Scarborough LLP

(57) ABSTRACT

An unmanned device for a marine environment comprises a location sensor configured to gather location data corresponding to the unmanned device; at least one propulsion system; a transmitter and memory including computer program code. The computer program code is configured to, when executed, cause the processor to cause the propulsion system to propel the unmanned device in a pattern along the body of water, cause the sonar transducer to emit the one or more sonar beams into the body of water, receive sonar return data corresponding to sonar returns, and generate a sonar image corresponding to the sonar return data. Further, the computer program code is configured to cause the processor to detect an object within the sonar image, assign a score to the object indicating the likelihood that the object is a desired object type, and send an alert to the remote electronics device upon assignment of the score.

18 Claims, 16 Drawing Sheets

(51) Int. Cl.

| | |
|---|---|
| *G05D 1/606* | (2024.01) |
| *G05D 101/20* | (2024.01) |
| *G05D 105/55* | (2024.01) |
| *G05D 105/80* | (2024.01) |
| *G05D 109/30* | (2024.01) |
| *G05D 111/20* | (2024.01) |
| *G06F 16/587* | (2019.01) |

(52) U.S. Cl.
CPC ..... *G05D 2101/20* (2024.01); *G05D 2105/55* (2024.01); *G05D 2105/80* (2024.01); *G05D 2109/34* (2024.01); *G05D 2111/20* (2024.01)

(58) Field of Classification Search
CPC ...... B63B 27/36; G01C 21/203; B64U 10/14; B63C 9/00; G06F 16/587
See application file for complete search history.

(56) References Cited

U.S. PATENT DOCUMENTS

| | | | |
|---|---|---|---|
| 7,606,114 B2 | 10/2009 | Bachelor et al. | |
| 8,437,885 B1 | 5/2013 | Beazley et al. | |
| 8,645,012 B2 | 2/2014 | Salmon et al. | |
| 8,761,976 B2 | 6/2014 | Salmon et al. | |
| 9,132,900 B2 | 9/2015 | Salmon et al. | |
| 9,423,259 B2 * | 8/2016 | Kabel | G01C 21/203 |
| 10,019,002 B2 | 7/2018 | Harnett et al. | |
| 10,247,823 B2 * | 4/2019 | Brown | G01S 7/629 |
| 10,553,122 B1 | 2/2020 | Gilboa-Amir et al. | |
| 10,725,469 B2 | 7/2020 | Harnett et al. | |
| 11,231,706 B1 | 1/2022 | Curlander et al. | |
| 2009/0016161 A1 * | 1/2009 | Gendron | G01S 7/539 367/88 |
| 2009/0037040 A1 | 2/2009 | Salmon et al. | |
| 2014/0277864 A1 * | 9/2014 | Sanders | G05D 1/0692 701/21 |
| 2014/0336854 A1 | 11/2014 | Salmon et al. | |
| 2015/0025797 A1 | 1/2015 | Hardesty et al. | |
| 2015/0142211 A1 | 5/2015 | Shehata et al. | |
| 2016/0054733 A1 | 2/2016 | Hollida et al. | |
| 2016/0147223 A1 | 5/2016 | Edwards et al. | |
| 2016/0214715 A1 | 7/2016 | Meffert | |
| 2017/0235308 A1 | 8/2017 | Gordon et al. | |
| 2018/0100922 A1 | 4/2018 | Wigh et al. | |
| 2018/0107210 A1 | 4/2018 | Harnett et al. | |
| 2018/0288990 A1 | 10/2018 | Laster et al. | |
| 2021/0237838 A1 * | 8/2021 | Grall | B63B 27/36 |
| 2023/0259128 A1 | 8/2023 | Harnett et al. | |

FOREIGN PATENT DOCUMENTS

| | | | |
|---|---|---|---|
| KR | 20160121915 A | 10/2016 | |
| KR | 102355753 B1 * | 1/2022 | B64U 10/14 |
| WO | WO 2006/017511 A2 | 2/2006 | |
| WO | WO 2013/126761 A1 | 8/2013 | |
| WO | WO 2014/144471 A1 | 9/2014 | |
| WO | WO 2016/205938 A1 | 12/2016 | |

OTHER PUBLICATIONS

AeroKontiki —Introducing the world's first autopilot fishing drone kontiki website visited Oct. 25, 2016 (4 pgs.) http://www.aerokontiki.com/.

DIY Drones—The Leading Community for Personal UAVs—Home website visited Oct. 25, 2016 (9 pgs.) www.diydrones.com.

DIY Drones—The Leading Community for Personal UAVs—My Blog Automated Precision Landing on a (stationary) Boat website visited Oct. 25, 2016 (6 pgs.) www.diydrones.com/profiles/blogs/automated-precision-landing-on-a-stationary-boat.

Visual Aerials—Flying Off a Boat—Mark and Romeo's Aerial Adventures website visited Oct. 25, 2016 (3 pgs.) http://www.visual-aerials.com/flying-off-a-boat.html.

Unmanned Marine Systems USV Website visited Oct. 26, 2016 (12 pgs.) http://www.unmannedsystemstechnology.com/company/autonomous-surface-vehicles-ltd/.

ADS, Inc.; "SeaBotix—Underwater Remotely Operated Vehicles (ROVs)"; *YouTube*, Jul. 16, 2014; retrieved from https://www.youtube.com/watch?v=hkqJh5j6eQA.

Teledyne Marine; "SmartFlight 2.0 powered by Greensea"; retrieved Jun. 19, 2019 from http://www.teledynemarine.com/smartflight2-0?ProductLineID=112.

"LED Programmable Message Pocket Fan & Rave Toy"; retrieved Jan. 31, 2019 from https://www.amazon.com/LED-Programmable-Message-Pocket-Rave/dp/B002FWOYG2.

* cited by examiner

100

600 ⟍

DEPLOY UNMANNED VESSEL ⟋ 602

EMIT SONAR BEAMS ⟋ 604

RECEIVE SONAR RETURNS ⟋ 606

DETECT OBJECT IN SONAR RETURNS ⟋ 608

SCORE DETECTED OBJECT ⟋ 610

ALERT USER OF LOCAITON OF THE DETECTED OBJECT ⟋ 612

700

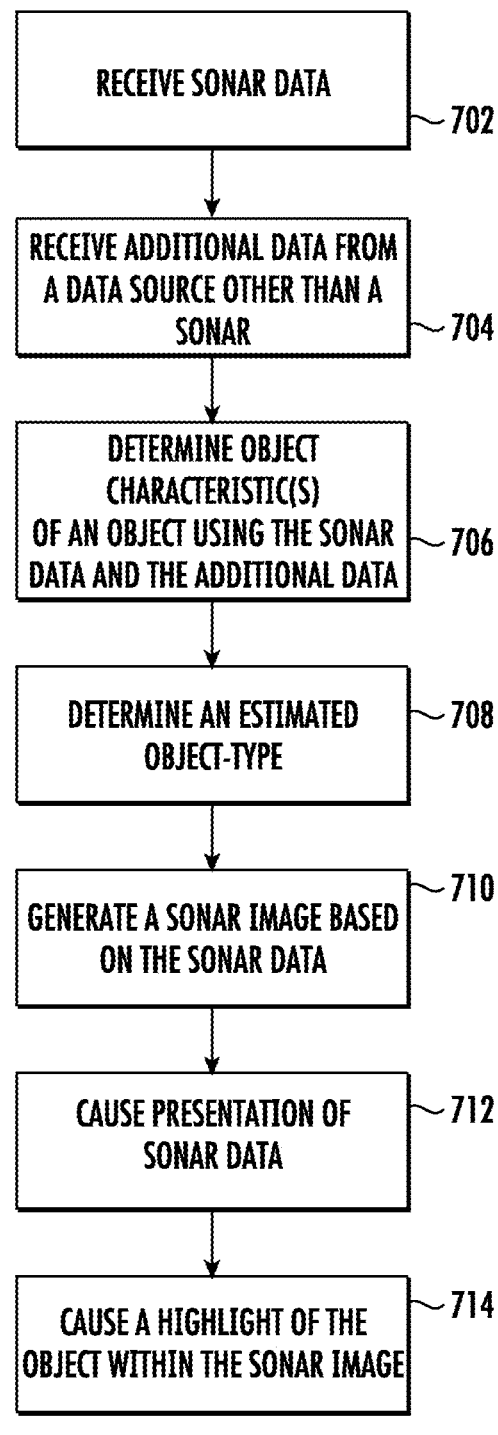

```
┌─────────────────────────┐
│   RECEIVE SONAR DATA    │ ~702
└─────────────────────────┘
            │
            ▼
┌─────────────────────────┐
│ RECEIVE ADDITIONAL DATA │
│ FROM A DATA SOURCE      │ ~704
│ OTHER THAN A SONAR      │
└─────────────────────────┘
            │
            ▼
┌─────────────────────────┐
│   DETERMINE OBJECT      │
│   CHARACTERISTIC(S)     │
│ OF AN OBJECT USING THE  │ ~706
│ SONAR DATA AND THE      │
│ ADDITIONAL DATA         │
└─────────────────────────┘
            │
            ▼
┌─────────────────────────┐
│ DETERMINE AN ESTIMATED  │ ~708
│ OBJECT-TYPE             │
└─────────────────────────┘
            │
            ▼
┌─────────────────────────┐
│ GENERATE A SONAR IMAGE  │ ~710
│ BASED ON THE SONAR DATA │
└─────────────────────────┘
            │
            ▼
┌─────────────────────────┐
│ CAUSE PRESENTATION OF   │ ~712
│ SONAR DATA              │
└─────────────────────────┘
            │
            ▼
┌─────────────────────────┐
│ CAUSE A HIGHLIGHT OF    │
│ THE OBJECT WITHIN THE   │ ~714
│ SONAR IMAGE             │
└─────────────────────────┘
```

EMIT ONE OR MORE SONAR BEAMS ⟋ 802

RECEIVE SONAR RETURNS ⟋ 804

DETECT A FIRST OBJECT WITHIN THE EMITTED SONAR BEAMS ⟋ 806

SCORE THE FIRST OBJECT ⟋ 808

DETECT A SECOND OBJECT WITHIN THE EMITTED SONAR BEAMS ⟋ 810

SCORE THE SECOND OBJECT ⟋ 812

CREATE A ROUTE BETWEEN THE FIRST OBJECT AND THE SECOND OBJECT ⟋ 814

AUTONOMOUS DEVICES AND METHODS OF USE

FIELD OF THE INVENTION

Embodiments of the present invention relate generally to autonomous devices, and more particularly, to autonomous devices for searching marine environments and providing information on detected objects within the marine environment.

BACKGROUND OF THE INVENTION

Searching bodies of water and other marine environments poses a challenge for search and rescue and other recovery personal. The marine environment is constantly change due to environmental factors, including waves, inlet and outlet sources, temperature changes, etc. Additionally due to the size and nature of a body of water (e.g., the underwater environment) it may be hard to conduct an only visual search, as a visual search may not be able to accurately cover or view the entire marine environment.

A prompt search of a body of water may be required to recover lost persons, watercrafts, or other objects. Searching an underwater environment requires significant manpower, for example, to operate watercrafts, review sonar images, coordinate the search, etc. However, in many search operations, time is a valuable asset, and manpower may be hard to coordinate and deploy in a timely manner. Thus, there exists a need for a system and device to conduct search operations in a timely manner when there is a lack of manpower, and/or to expedite search and rescue operations.

BRIEF SUMMARY OF THE INVENTION

To facilitate search efforts, autonomous devices (e.g., drones or similar vehicles) may be deployed in the area to be searched. Utilizing autonomous devices may allow for rapid deployment of search tools to begin a search effort. In this regard, an autonomous device may be deployed into a body of water and may utilize sonar and/or other types of imaging systems to search the underwater environment. In addition to being autonomous, the device may follow predetermined search route patterns to search the underwater environment and may utilize artificial intelligence to detect and identify objects present in sonar images. In some embodiments, the device may include systems to send and receive instructions/ signals to a remote electronic device. The instructions/ signals may include scores corresponding to the likelihood of interest of detected objects, coordinates of each detected object, search patterns for a searcher to take, or similar.

Example systems may emit one or more sonar beams into the underwater environment, and receive sonar returns corresponding to the emitted one or more sonar beams. The system may generate a sonar image of the underwater environment utilizing the sonar returns. The system may, for example, utilize artificial intelligence to analyze the sonar images and detect objects within the sonar image and compare each of the detected object to a desired object (e.g., a person, a watercraft, a vehicle, etc.). Each detected object may be scored, with the score representing the likelihood the detected object is a desired object. Upon detecting an object, such as an object with a score within a threshold value, an alert may be sent to a remote electronic device, indicating the location of the detected object. Further, in some embodiments, upon completion of the route, the unmanned device may send an indication to the remote electronic device of a suggested route for a user to cover based on the detected objects with the highest scores. This may advantageously allow the entire body of water to be searched while providing indication of the locations where detected objects exhibit a high likelihood of being the same type of object as the desired object.

In an example embodiment, an unmanned device for a marine environment is provided. The unmanned device is configured to travel upon a surface of a body of water. The unmanned device comprises a location sensor configured to gather location data corresponding to the unmanned device, and at least one propulsion system configured to propel the unmanned device. The unmanned device further comprises at least one sonar transducer configured to emit one or more sonar beams into an underwater environment of the body of water in a direction relative to the unmanned device. Further, the unmanned device comprises a transmitter to transmit data to a remote electronics device, a processor, and a memory including computer program code. The computer program code is configured to, when executed, cause the processor to cause the at least one propulsion system to propel the unmanned device in a pattern along the body of water. The computer program code is further configured to cause the at least one sonar transducer to emit one or more sonar beams into the body of water, and receive sonar return data corresponding to sonar returns received by the at least one sonar transducer. The computer program code is further configured to generate a sonar image corresponding to the sonar return data and detect one or more objects within the sonar image. The computer program code is further configured to assign a score to the one or more objects, the score providing an indication of the likelihood that the one or more objects is a desired object type. The computer program code is further configured to send an alert to the remote electronics device upon assignment of the score.

In some embodiments, the at least one sonar transducer may be towed by the unmanned device. In some embodiments, the at least one sonar transducer my be positioned at least partially below a surface of the body of water.

In some embodiments, the score may be determined from the sonar data and one or more object characteristics. The one or more object characteristics may comprise at least one of a shape of an object, a depth of the object, an environment of the object, a velocity of the object, a temperature of the body of water, a behavior of the object, a geographical area, a time of day, or a time of year. In some embodiments, the score may be determined by comparing the detected object to an object database. The object database may comprise sonar images of known objects. In some embodiments, the object database may further comprise sonar images of the underwater environment. In some embodiments, the sonar images of the underwater environment may include one or more previously detected objects, and location data associated with the previously detected objects.

In some embodiments, the unmanned device may further comprise a receiver. The receiver may be configured to receive instructions from the remote electronics device. In some embodiments, the at least one propulsion system may be configured to correct for environmental factors. In some embodiments, the alert may include location data associated with the detected object.

In another example embodiment, a method of identifying objects in an underwater environment is provided. The method comprises deploying an unmanned device to a body of water. The unmanned device comprises a location sensor configured to gather location data corresponding to the unmanned device and at least one propulsion system configured to propel the unmanned device along the body of water. The unmanned device further comprises a transmitter configured to transmit data to a remote electronics device, and at least one sonar transducer. The at least one sonar transducer is configured to emit one or more sonar beams into an underwater environment of the body of water in a direction relative to the unmanned device. The method further comprises causing the at least one propulsion system to propel the unmanned device in a pattern relative to the body of water and causing the at least one sonar transducer to emit the one or more sonar beams into the underwater environment. The method further comprises receiving sonar return data corresponding to sonar returns received by the at least one sonar transducer and generating a sonar image corresponding to the sonar return data. The method further comprises determining a desired object type and detecting at least one object within the sonar image. The method further comprises assigning a score to the one or more objects detected within the sonar image. The score being an indication of the likelihood that the at least one object is the desired object type. The method further comprises sending an alert to the remote electronics device when the score is above a threshold value.

In some embodiments, the score may be determined from the sonar data and one or more object characteristics. The one or more object characteristic may comprise at least one of a shape of the object, a depth of the object, an environment of the object, a velocity of the object, a temperature of the body of water, a behavior of the object, a geographical area, a time of day or a time of year.

In some embodiments, the score may be determined by comparing the detected object to an object database. The object database may comprise sonar images of known objects. In some embodiments, the object database may further comprise sonar images of the underwater environment. In some embodiments, the sonar images of the underwater environment may include one or more previously detected objects, and location data associated with the previously detected objects. In some embodiments, the alert may include location data associated with the detected object.

In some embodiments, the unmanned device may further comprise a receiver. In some embodiments, the method may further comprise receiving at least one instruction from the remote electronics device.

In yet another example embodiment, a system for determining an identity of an object in an underwater environment is provided. The system comprises a remote electronics device, and an unmanned device in data communication with the remote electronics device. The unmanned device comprises a location sensor configured to gather location data corresponding to the unmanned device and at least one propulsion system configured to propel the unmanned device. The unmanned device further comprises at least one sonar transducer. The at least one sonar transducer is configured to emit one or more sonar beams into an underwater environment of the body of water in a direction relative to the unmanned device. The unmanned device further comprises a transmitter configured to transmit data to a remote electronics device, a processor and a memory including a computer program code. The computer program code is configured to, when executed, by the processor cause the at least one propulsion system to propel the unmanned device in a pattern along the body of water and cause the at least one sonar transducer to emit the one or more sonar beams into the body of water. The computer program code is further configured to receive sonar return data corresponding to the sonar returns received by the at least one sonar transducer and generate a sonar image corresponding to the sonar return data. The computer program code is further configured to detect one or more objects within the sonar image and assign a score to the one or more objects. The score provides an indication of the likelihood that the one or more objects is a desired object type. The computer program code is further configured to send an alert to the remote electronics device upon assignment of the score.

In some embodiments, the score may be determined from the sonar data and one or more object characteristics. The one or more object characteristics may comprise at least one of a shape of an object, a depth of the object, an environment of the object, a velocity of the object, a temperature of the body of water, a behavior of the object, a geographical area, a time of day, or a time of year. In some embodiments, the score may be determined by comparing the detected object to an object database. The object database may comprise distinct object data which corresponds to the object characteristic for a type of object.

BRIEF DESCRIPTION OF THE DRAWINGS

Figure 1:
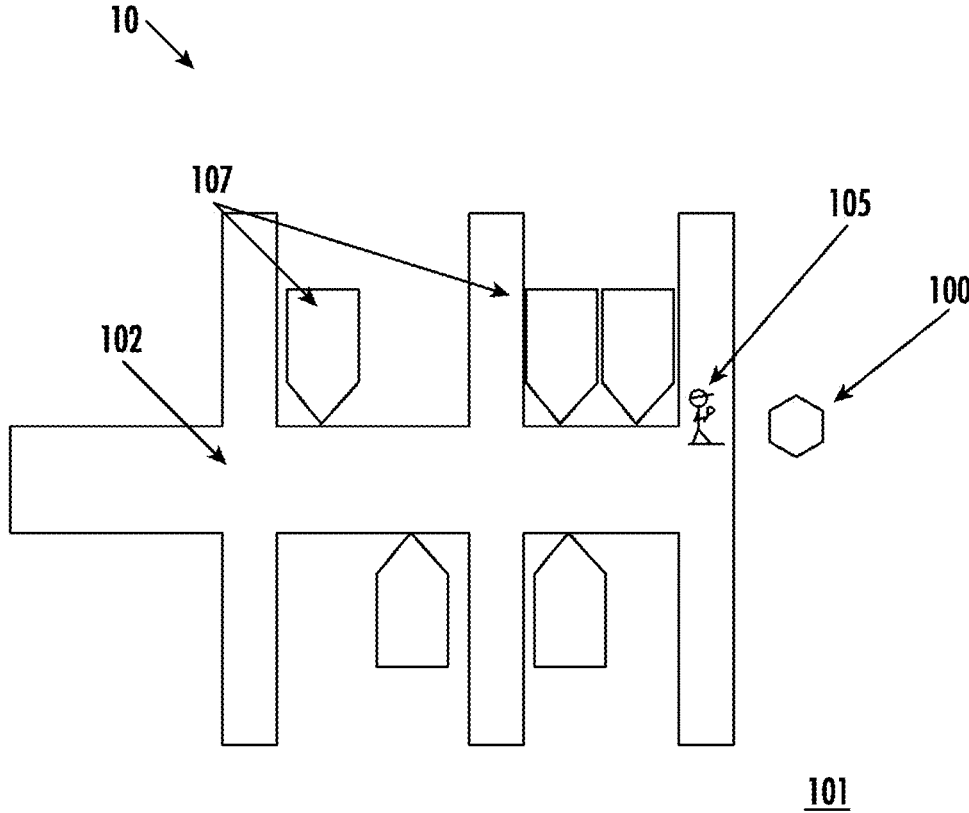
Figure 2:
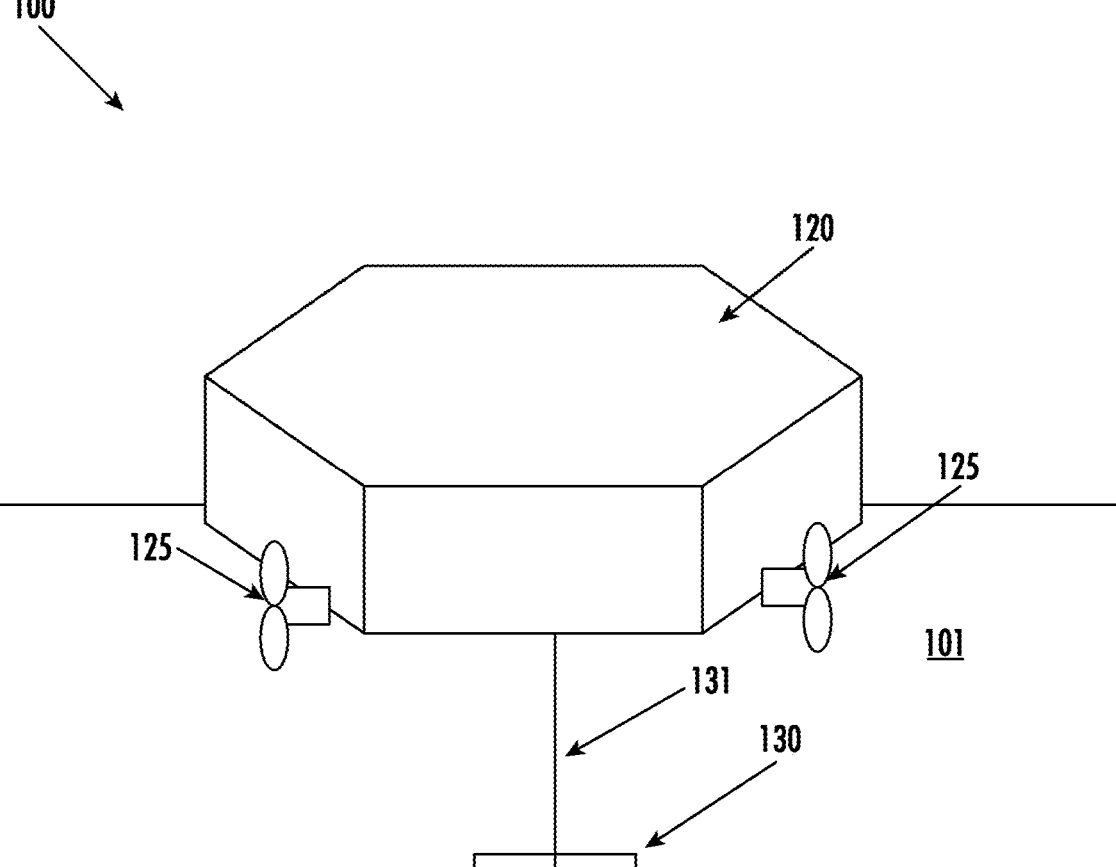
Figure 3:
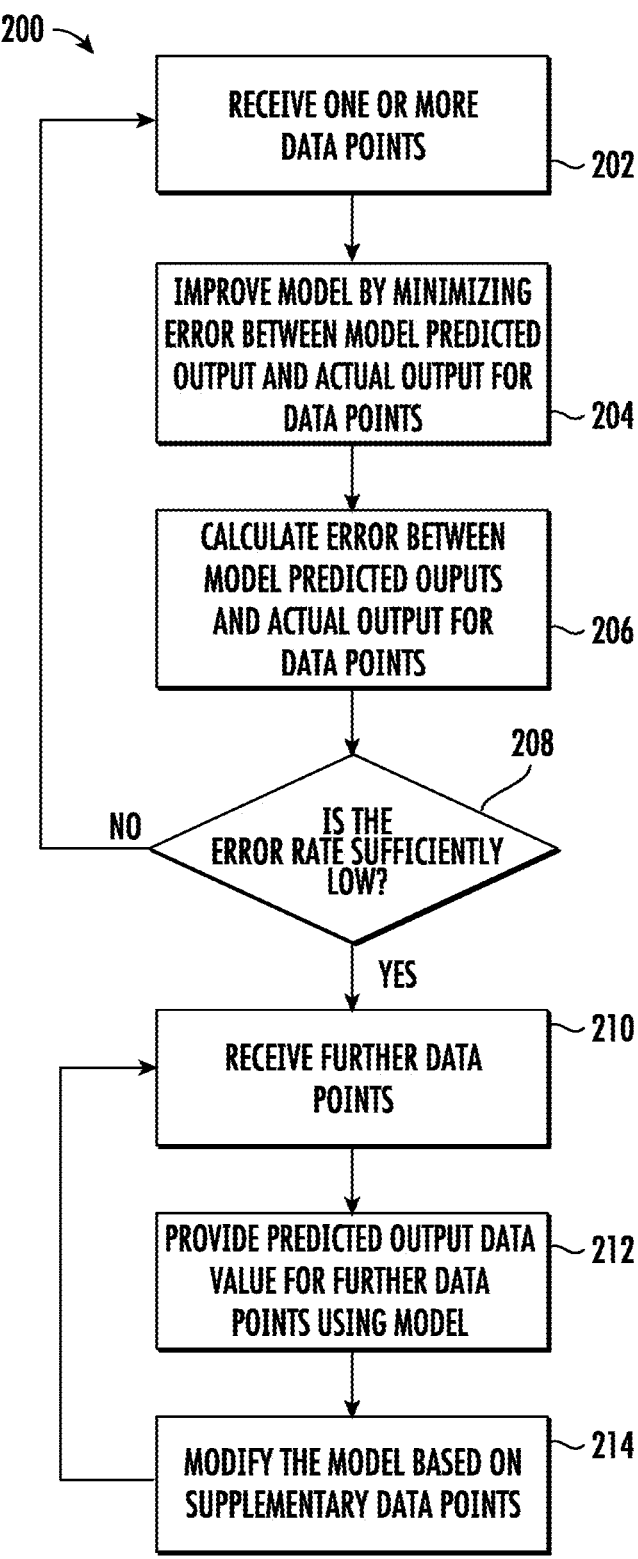
Figure 4:
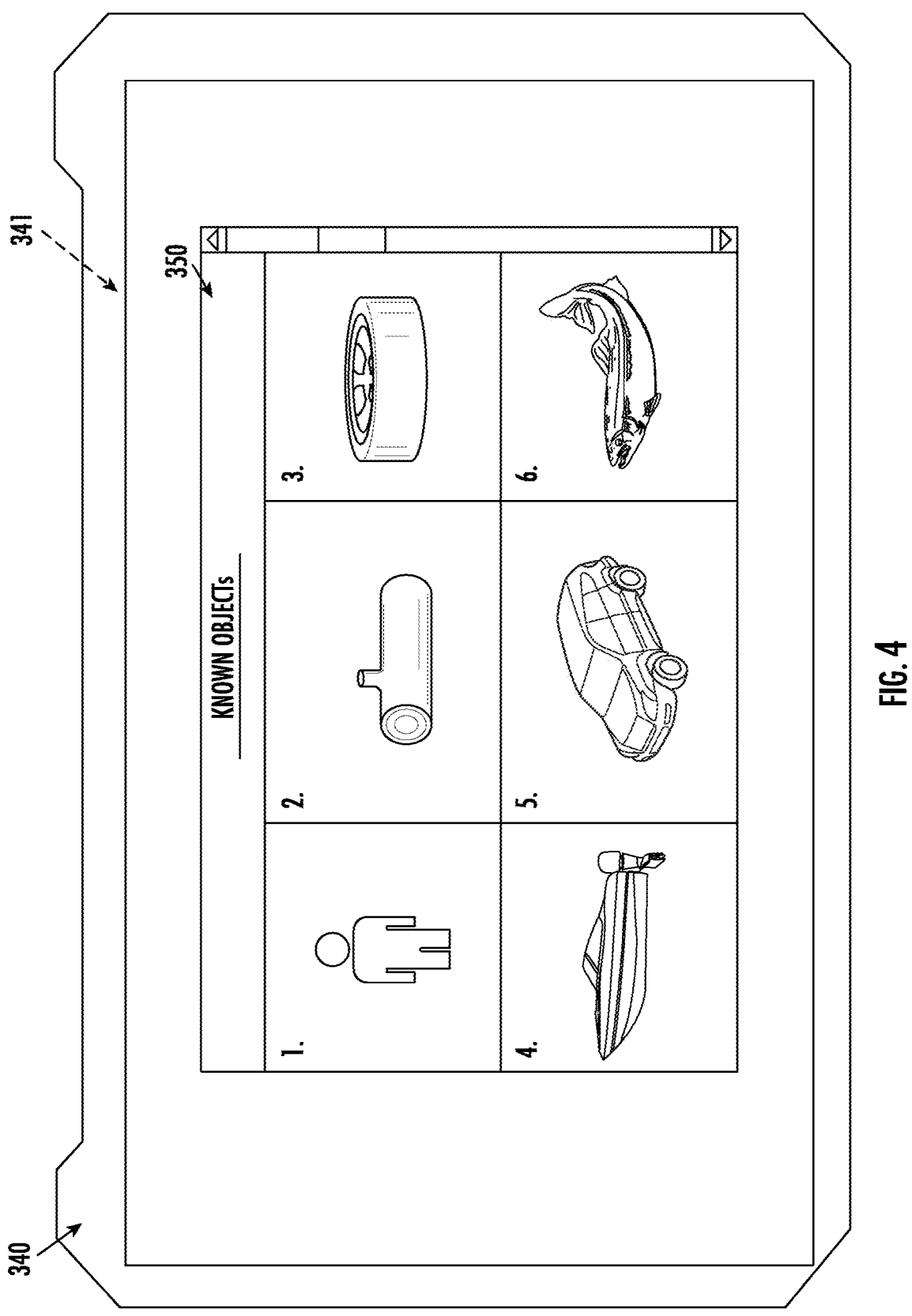
Figure 5A:
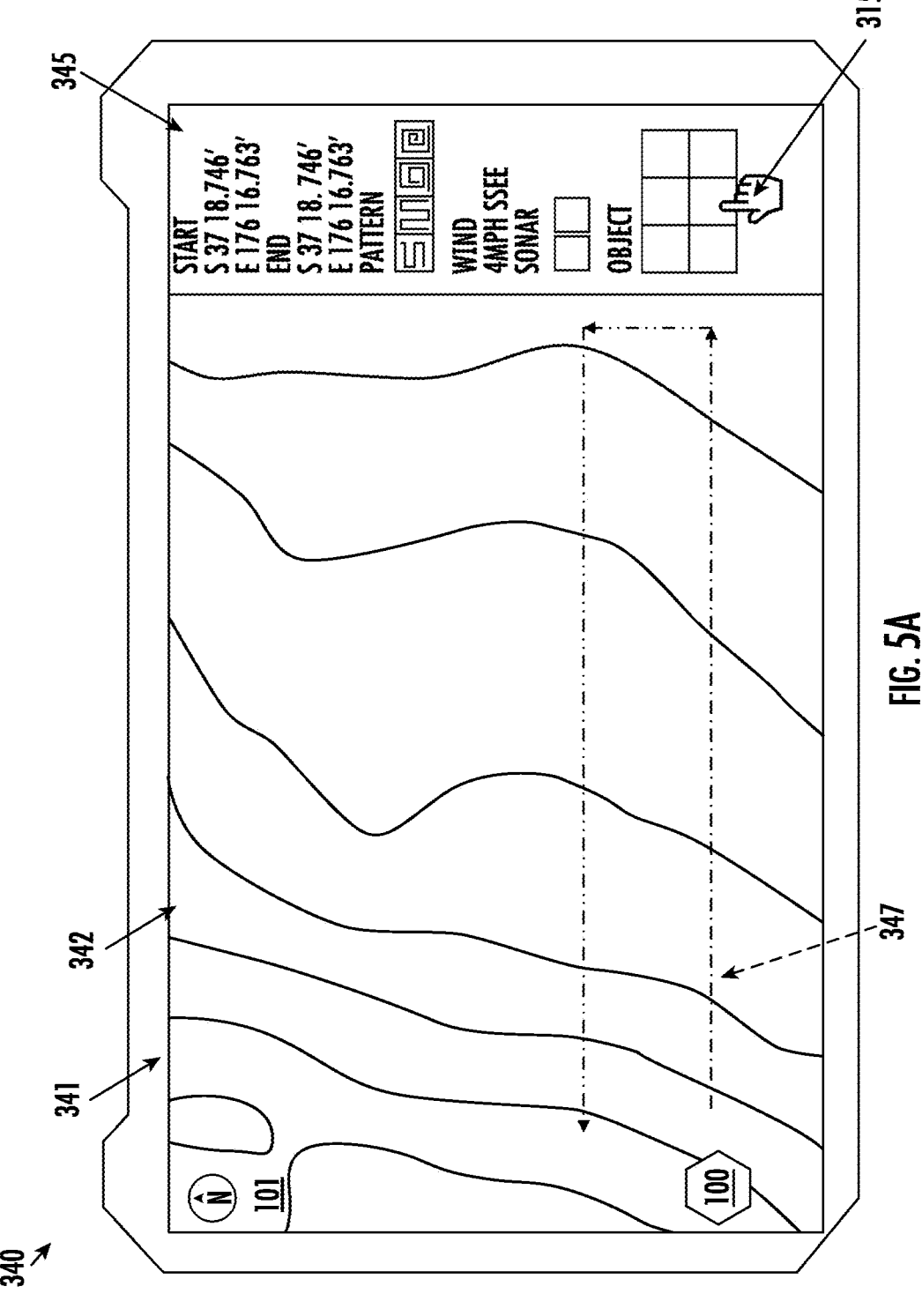
Figure 5B:
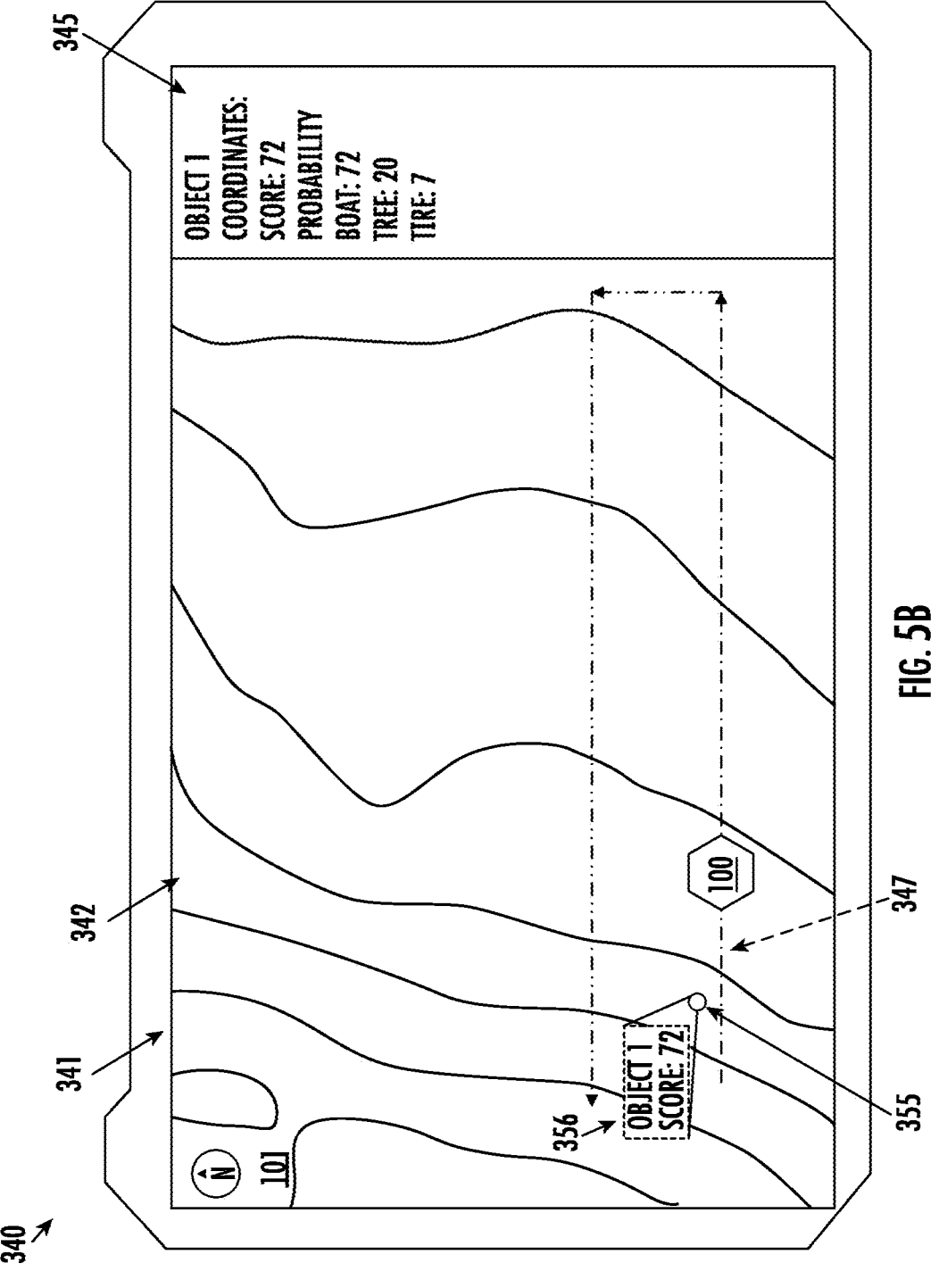
Figure 5C:
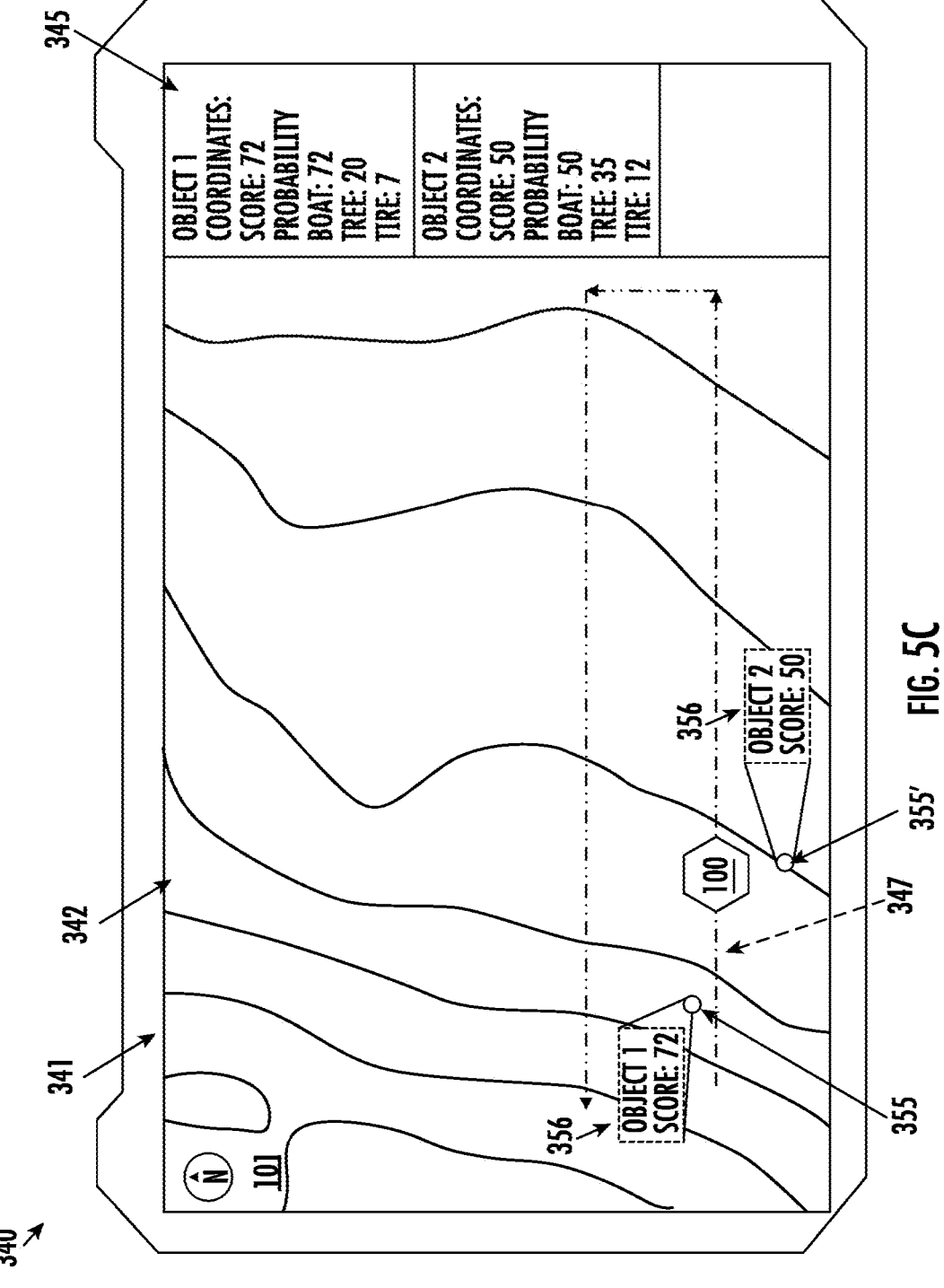
Figure 5D:
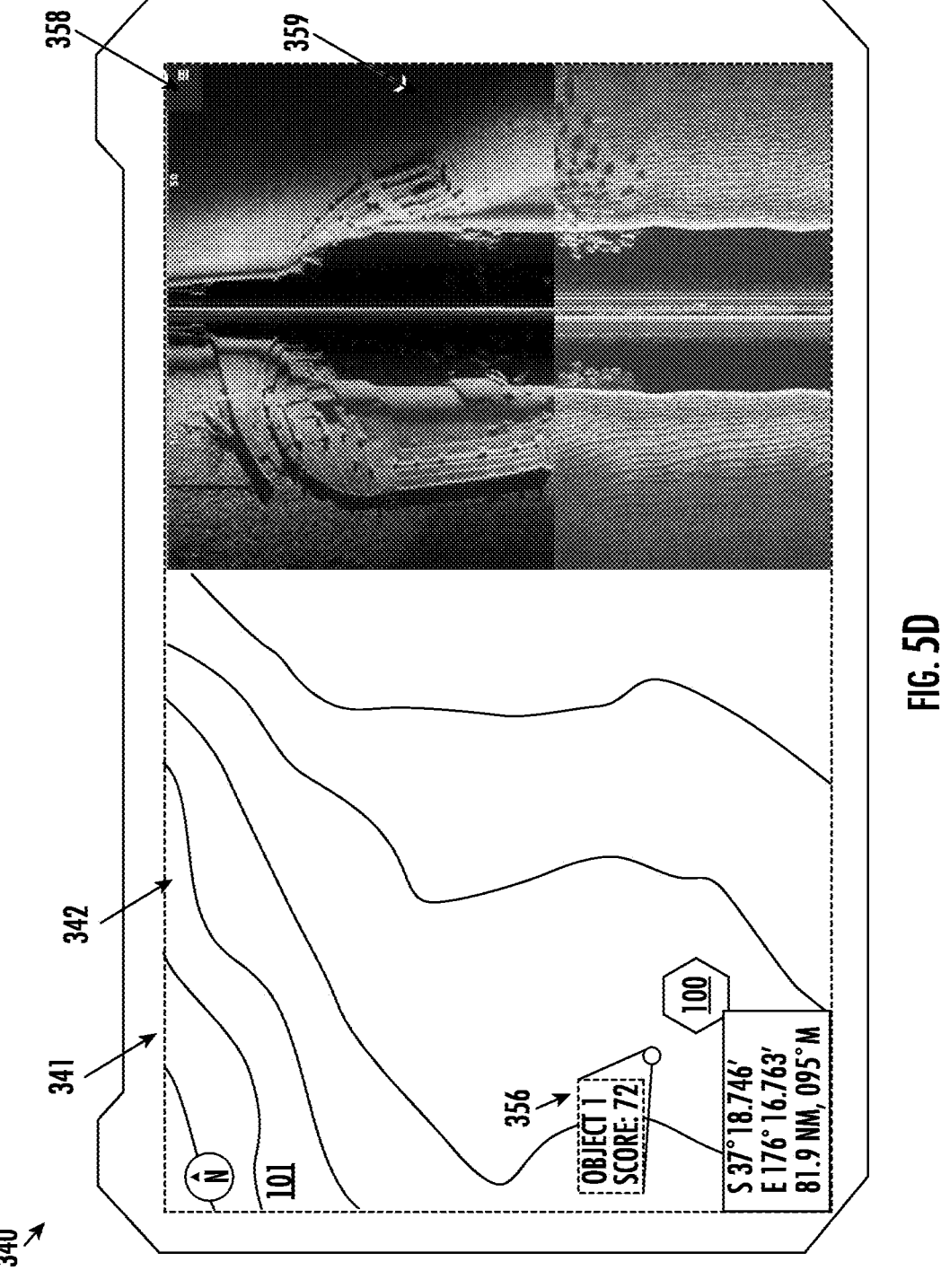
Figure 6A:
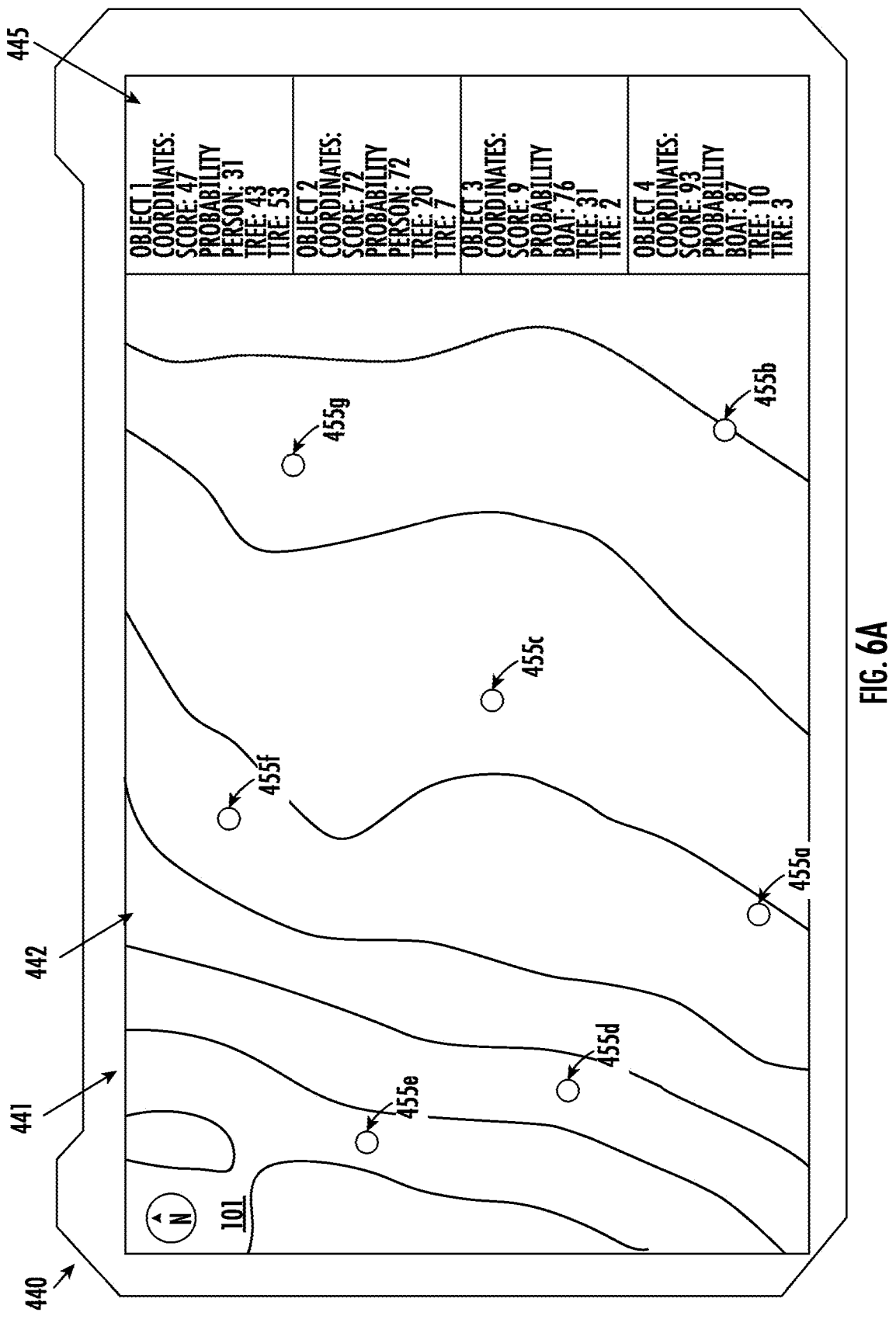
Figure 6B:
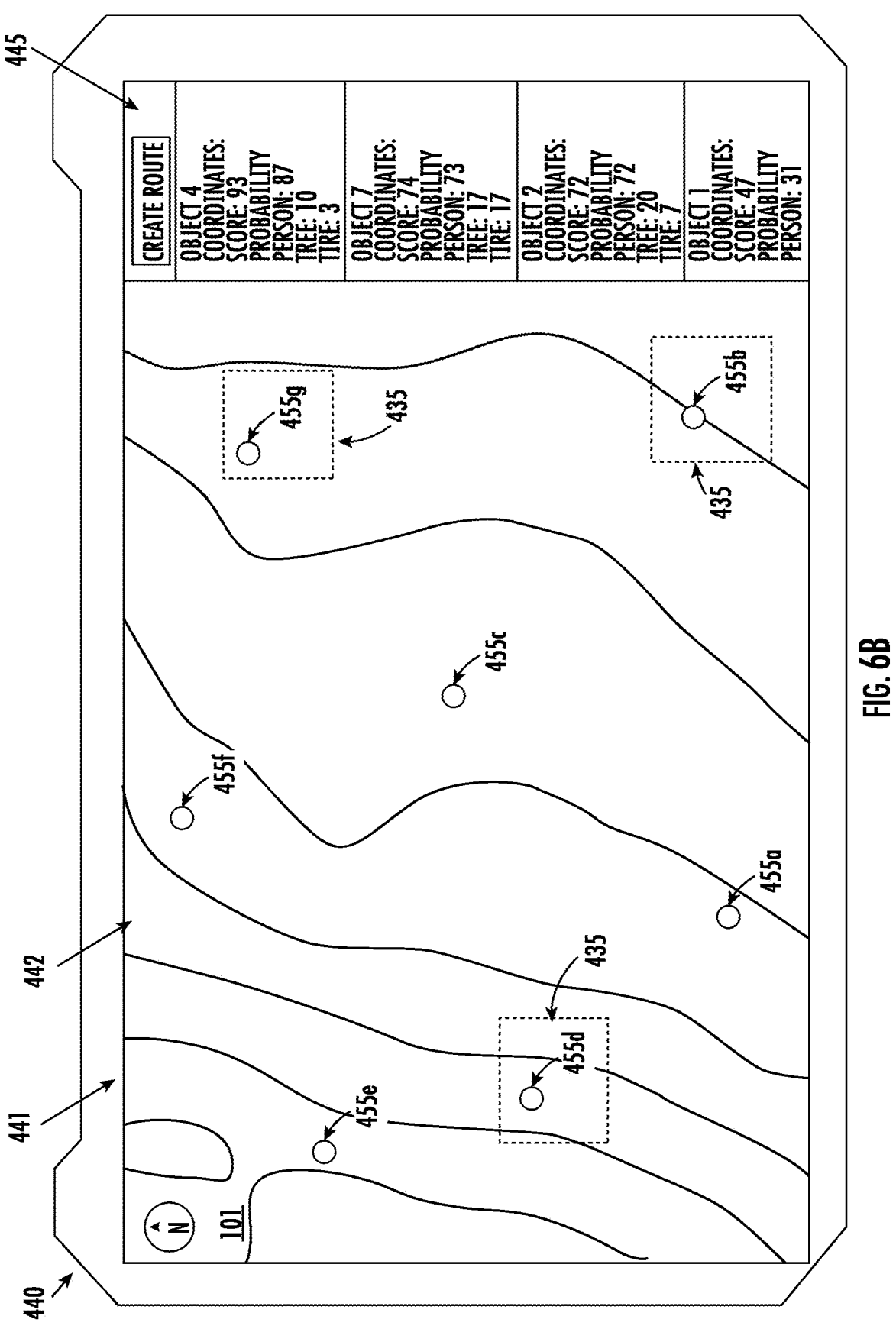
Figure 6C:
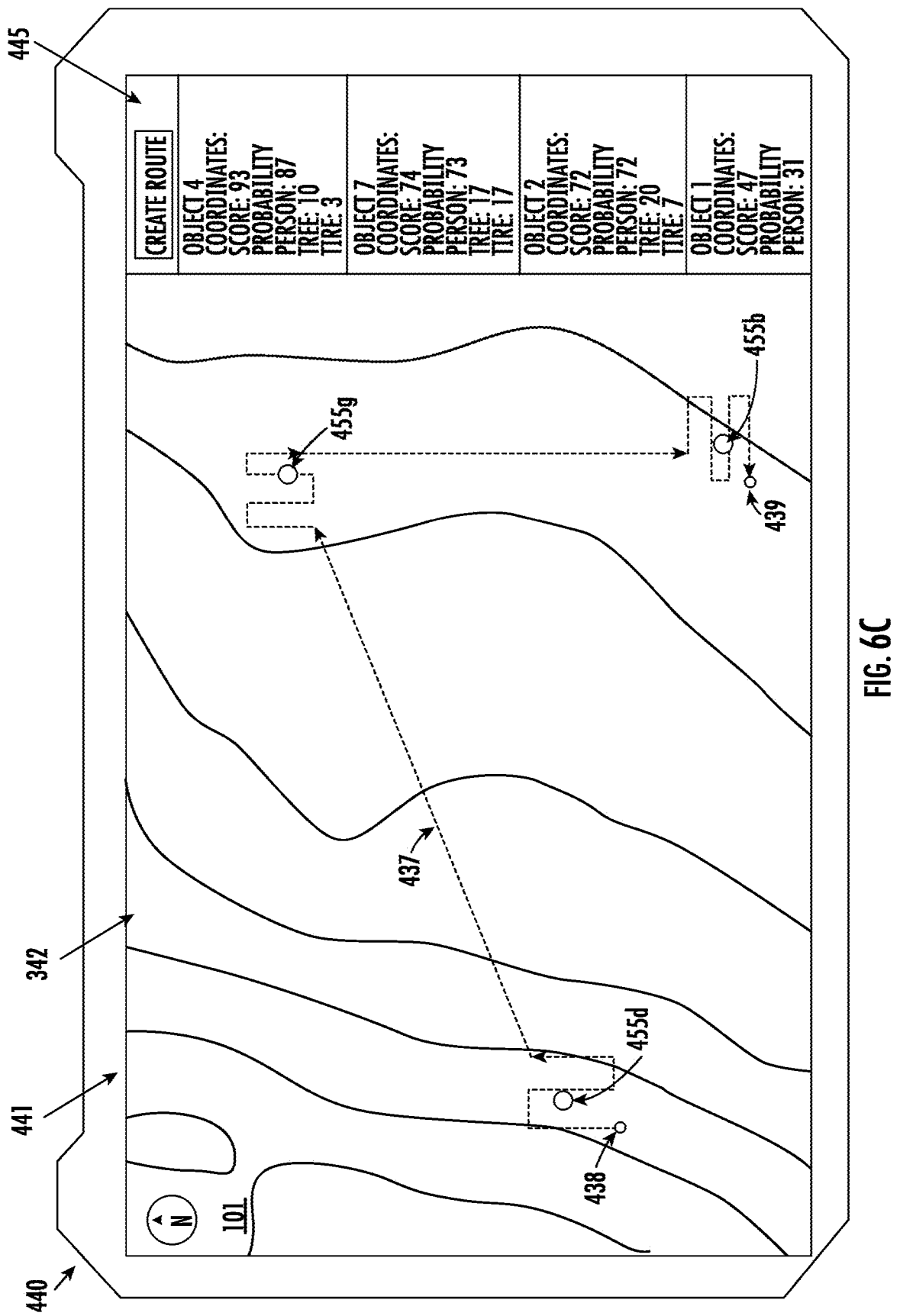
Figure 7:
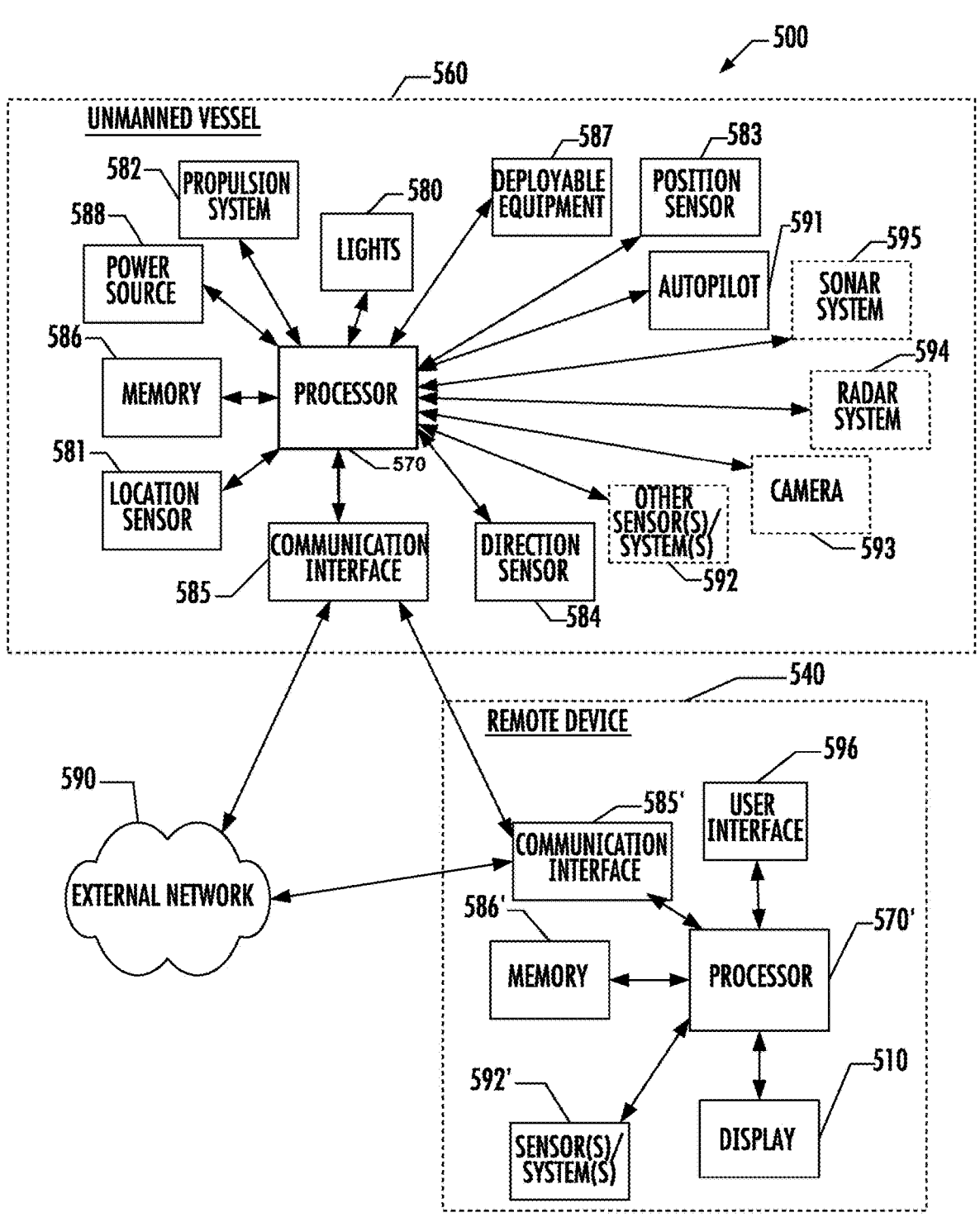
Figure 8:
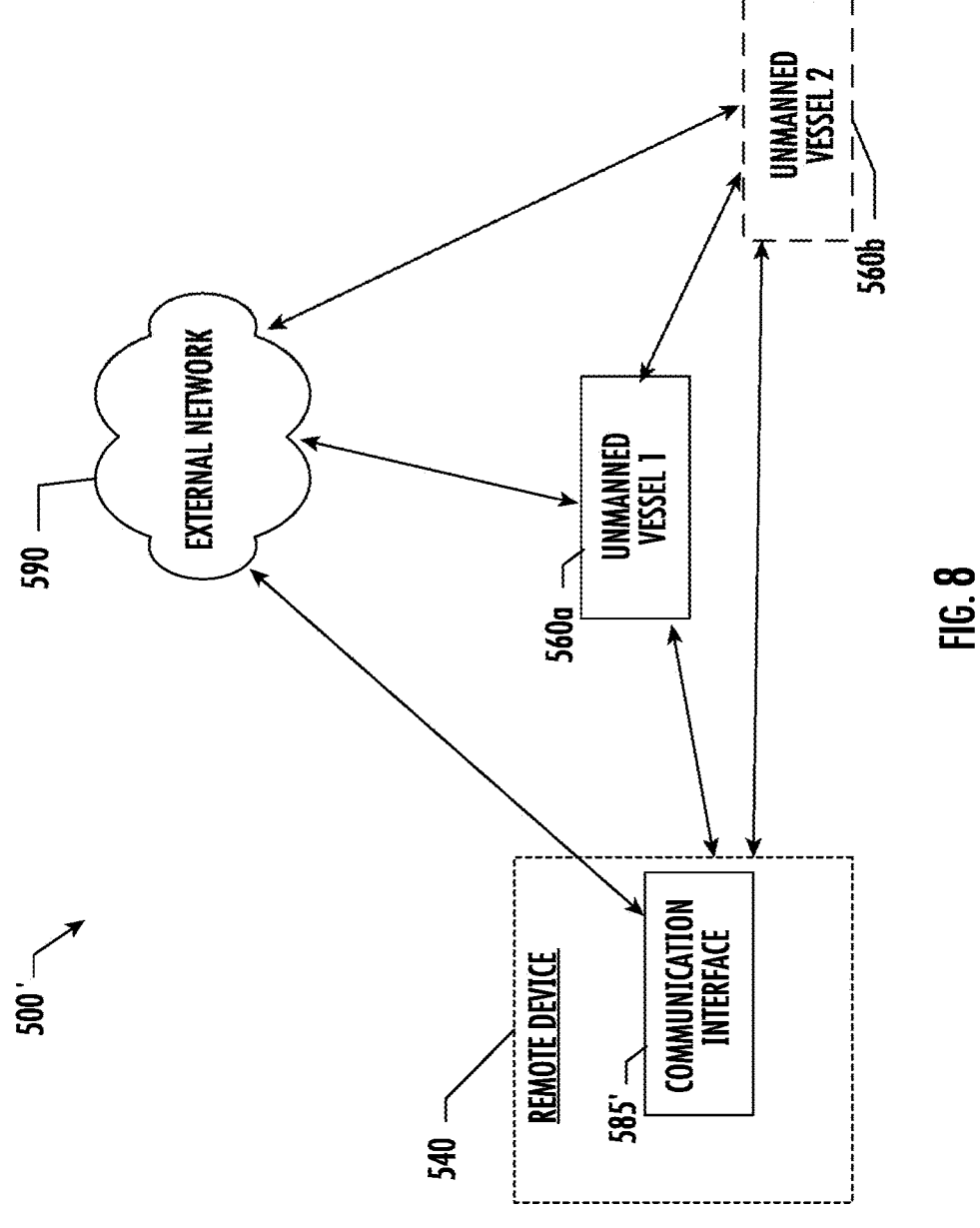
Figure 9:
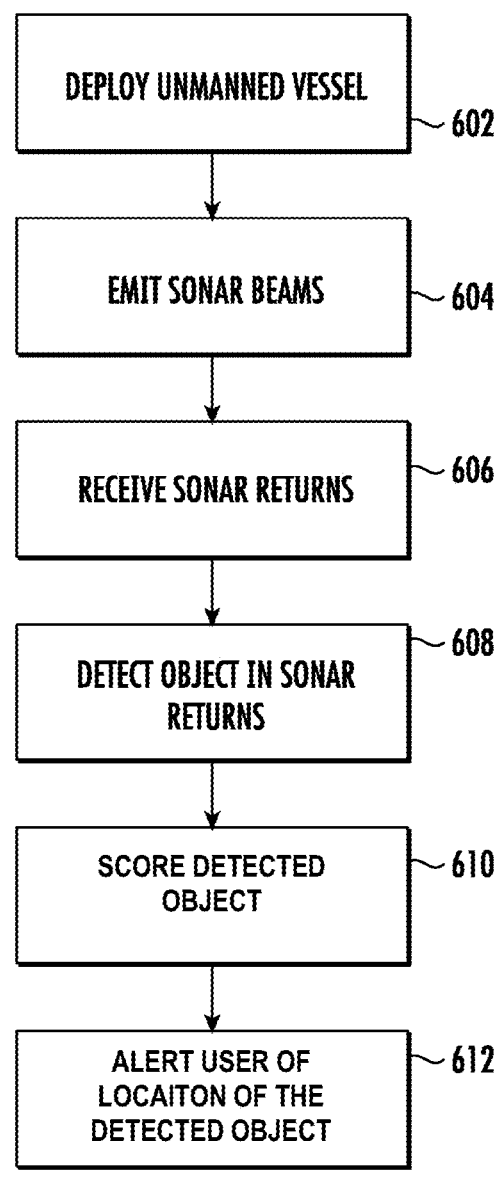
Figure 11:
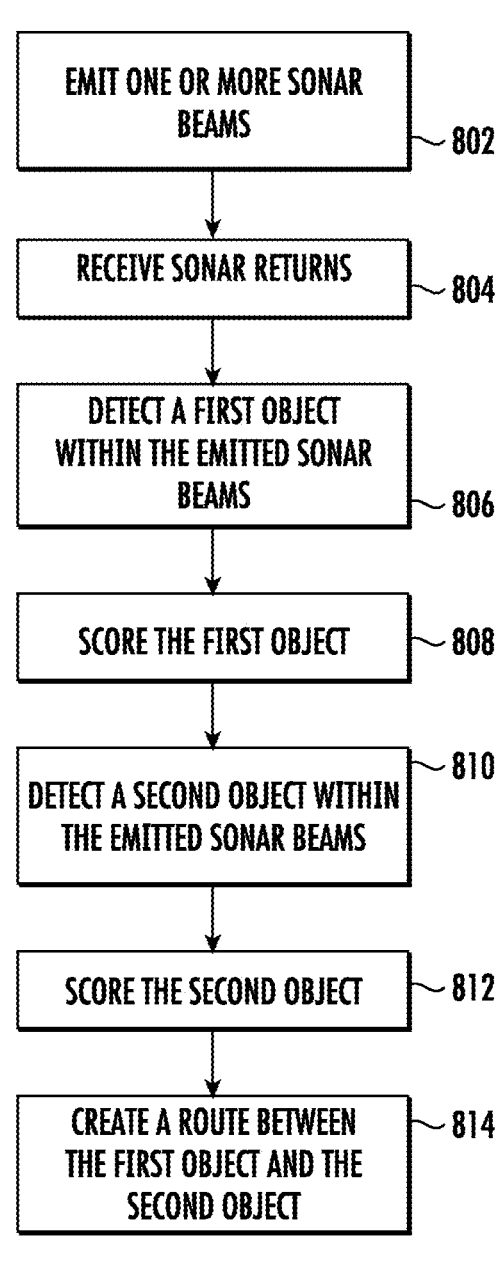

Having thus described the invention in general terms, reference will now be made to the accompanying drawings, which are not necessarily drawn to scale, and wherein:

FIG. 1 illustrates a schematic view of an unmanned device being deployed from a dock, in accordance with some embodiments discussed herein;

FIG. 2 illustrates a perspective schematic view of the unmanned device partially submerged in a body of water, in accordance with some embodiments discussed herein;

FIG. 3 illustrates a flowchart of an example method of machine learning, in accordance with some embodiments discussed herein;

FIG. 4 illustrates an example remote electronic device presenting known objects, in accordance with some embodiments discussed herein;

FIG. 5A illustrates a remote electronic device presenting a chart with a determined route of the unmanned device, in accordance with some embodiments discussed herein;

FIGS. 5B-C illustrate the remote electronic device presenting the chart and indications of detected objects and data associated therewith, in accordance with some embodiments discussed herein;

FIG. 5D illustrates the remote electronic device presenting a split screen including the chart and a sonar image associated with the detected object, in accordance with some embodiments discussed herein;

FIG. 6A illustrates the remote electronic device presenting a chart indicating the locations of detected objects and associated data therewith, in accordance with some embodiments discussed herein;

FIG. 6B illustrates the remote electronic device presenting the chart highlighting the detected objects with the highest object score, in accordance with some embodiments discussed herein;

FIG. 6C illustrates the remote electronic device presenting the chart and a determined route between the highlighted objects, in accordance with some embodiments discussed herein;

FIG. 7 illustrates a block diagram of an example system with an example unmanned device, in accordance with some embodiments discussed herein;

FIG. 8 illustrates a block diagram of an example system with various unmanned devices, in accordance with some embodiments discussed herein; and FIGS. 9-11 illustrate flowcharts with example methods of presenting object data in a display, in accordance with some embodiments discussed herein.

DETAILED DESCRIPTION

Example embodiments of the present invention now will be described more fully hereinafter with reference to the accompanying drawings, in which some, but not all embodiments of the invention are shown. Indeed, the invention may be embodied in many different forms and should not be construed as limited to the example embodiments set forth herein; rather, these embodiments are provided so that this disclosure will satisfy applicable legal requirements. Like reference numerals refer to like elements throughout.

FIG. 1 illustrates an example circumstance 10 where a user 105 may deploy an unmanned device 100 from a dock 102. In some embodiments, the user 105 may toss the unmanned device 100 off of the dock, place the unmanned device 100 in the water near the dock or shore, launch the unmanned device 100 from a watercraft 107 in the body of water, or similar. In some embodiments, as will be discussed herein, the user 105 may send instructions to the unmanned device 100 via a remote electronic device, while in other embodiments, instructions may be programmed on the unmanned device 100. In some embodiments, the remote electronic device may be used at the body of water (e.g., on the dock 102), while in other embodiments, the remote electronic device may be in a centralized location (e.g., a police station) such that multiple users may monitor the remote electronic device at the same time. In some embodiments, there may be more than one unmanned device deployed within the water. Additionally or alternatively, there may be multiple remote electronic devices in data communication with the unmanned device 100.

With reference to FIG. 2, the unmanned device 100 may be an above water unit which floats on a body of water and may receive and send information to one or more remote electronic devices. In some embodiments, the unmanned device 100 may comprise a body 120 and one or more propellers 125. The body 120 may be configured to, remain at least partially, above the surface of the body of water 101 throughout the deployment.

In some embodiments, the unmanned device 100 may comprise various devices housed within the body 120. In this regard, the body 120 of the unmanned device 100 may be waterproof to thereby prevent failure of the internal devices. In some embodiments, the unmanned device 100 may comprise a power source (e.g., 588 of FIG. 7), a propulsion system (e.g., 582 of FIG. 7), a location sensor (e.g., 581 of FIG. 7), a direction sensor (e.g., 584 of FIG. 7), a position sensor (e.g., 583 of FIG. 7), an autopilot (e.g., 591 of FIG. 7) a communication interface (e.g., 585 of FIG. 7), other deployable equipment (e.g., 587 of FIG. 7), lights (e.g., 580 of FIG. 7), and other sensors and systems (e.g., 592 of FIG. 7), optionally in some embodiments the unmanned device may comprise a camera (e.g., 593 of FIG. 7), a radar system (e.g., 594 of FIG. 7), a sonar system (e.g., 595 of FIG. 7). These devices may be configured to assist in the operations of the unmanned device 100, for example to propel the unmanned device 100 and collect and transmit data of the unmanned device 100. In some embodiments, the unmanned device 100 may comprise a processor (e.g., 570 of FIG. 7) which is in electrical and data communication with each of the systems within the unmanned device. The processor may be configured to run computer program products which utilize artificial intelligence to identify and detect objects within a sonar image according to some embodiments presented herein.

In some embodiments, the unmanned device 100 may be configured to navigate the body of water 101. The one or more propellers 125 may be configured to propel the unmanned device 100 along a desired route through the body of water 101. Some bodies of water 101 may comprise currents, and/or other environmental factors may cause movement of the unmanned device 100 along the body of water 101. Thus, the one or more propellers 125 may be configured to overcome and/or account for the currents and environmental factors, thereby causing the unmanned device 100 to maintain a course.

In some embodiments, the unmanned device 100 may comprise at least one sonar transducer 130. In some embodiments, the at least one sonar transducer may be fixed to the body 120 of the unmanned device 100, while in other embodiments, the unmanned device 100 may tow the at least one sonar transducer 130 below the surface of the body of water 101. In some embodiments, the at least one sonar transducer 130 may be attached to the unmanned device 100 by a cable 131 that maintains the relative position of the at least sonar transducer 130 in the underwater environment as compared to the body of the unmanned device 100. In this regard, the at least one sonar transducer 130 may provide a clear image of the underwater environment, as the at least one sonar transducer is not subject to the pitch and roll at the surface of the body of water, which may otherwise cause blurry or inconsistent images.

Example Use of Artificial Intelligence

FIG. 3 is a flowchart of an example method 200 of machine learning, such as may be utilized with artificial intelligence for various embodiments of the present invention. At least one processor or another suitable device may be configured to develop a model for the calculation of object characteristics and/or determination of an estimated object-type, such as described herein in various embodiments. In this regard, the developed model may be deployed and utilized to determine object characteristics and/or an estimated object-type for one or more objects that are detected within sonar data. In some embodiments, an unmanned device (e.g., 560 FIG. 7) or corresponding remote electronic device (e.g., 540 FIG. 7) may comprise one or more processors that perform the functions shown in FIG. 3.

This system may beneficially determine the type of object by accounting for sonar data and different types of additional data, and the developed model may assign different weights to different types of data that are provided. In some systems, even after the model is deployed, the systems may beneficially improve the developed model by analyzing further data points. By utilizing artificial intelligence, a novice user may benefit from the experience of the models utilized, making systems more user friendly and accessible/successful for beginners. Embodiments beneficially allow for accurate information to be provided about the objects represented within sonar data and also allow for information about these objects to be shared with the user (such as on the display) of the remote electronic device so that the user may make well-informed decisions. Additionally, the techniques may also enable displays that allow novice users to quickly and easily decipher sonar data and design search patterns and or suggested routes between detected objects. Utilization of the model may prevent the need for a user to spend a significant amount of time reviewing sonar data and other information, freeing the user to perform other tasks and enabling performance and consideration of complex estimations and computations that the user could not otherwise solve on their own (e.g., the systems described herein may also be beneficial for even the most experienced users).

By receiving several different types of data, the example method 200 may be performed to generate complex models. The example method 200 may find relationships between different types of data that may not have been anticipated. By detecting relationships between different types of data, the method 200 may generate accurate models even where a limited amount of data is available.

In some embodiments, the model may be continuously improved even after the model has been deployed. Thus, the model may be continuously refined based on changes in the systems or in the environment over time, which provides a benefit as compared with other models that stay the same after being deployed.

At operation 202, one or more data points are received. These data points may or may not be the initial data points being received. These data points preferably comprise known data on an object-type, object depth, object velocity, or some other object characteristic that the model may use to calculate an object score to indicate the likelihood that the object is a desired object type. For example, where the model is being generated to provide a score for a detected object, the data points provided at operation 202 will preferably comprise known data that corresponds to the object-type of the detected object. The data points provided at operation 202 will preferably be historical data points with verified values to ensure that the model generated will be accurate. The data points may take the form of discrete data points. However, where the data points are not known at a high confidence level, a calculated data value may be provided, and, in some cases, a standard deviation or uncertainty value may also be provided to assist in determining the weight to be provided to the data value in generating a model. In this regard, the model predicted object characteristic and/or predicted object-type may be formed based on historical comparisons of the sonar data and additional data.

For example, the model may be formed based on historical comparisons of a historical object-type with historical sonar data and historical additional data, and a processor may be configured to utilize the developed model to determine an object score indicating the likelihood that the detected object is the same object type and the desired object type. In some embodiments, the model may further be able to determine an estimated object-type for an object represented in sonar data. This model may be developed through machine learning utilizing artificial intelligence based on the historical comparisons of the historical object-type with historical sonar data and historical additional data. Alternatively, a model may be developed through artificial intelligence, and the model may be formed based on historical comparisons of additional data and the sonar data. A processor may be configured to use the model and input the sonar data and the additional data into the model to determine the one or more object characteristics.

Another example of appropriate historical comparisons may include comparing additional data (e.g., geographical data from maps or nautical charts, temperature data, time data, etc.) with sonar return data. Additional data may be provided from a variety of sources, and additional data may, for example, be provided from a camera, a radar, a thermometer, a clock, a pressure sensor, a direction sensor, or a position sensor.

At operation 204, a model is improved by minimizing error between a calculated object score and/or an estimated object-type generated by the model and an actual object type for data points. In some embodiments, an initial model may be provided or selected by a user. The user may provide a hypothesis for an initial model, and the method 200 may improve the initial model. However, in other embodiments, the user may not provide an initial model, and the method 200 may develop the initial model at operation 204, such as during the first iteration of the method 200. The process of minimizing error may be similar to a linear regression analysis on a larger scale where three or more different variables are being analyzed, and various weights may be provided for the variables to develop a model with the highest accuracy possible. Where a certain variable has a high correlation with one or more object types and object characteristics, that variable may be given increased weight in the model. For example, where data from maps or nautical charts are available, that data may be provided alongside with sonar data, and the model may be optimized to give the map data its appropriate weight. In refining the model by minimizing the error between the predicted object types generated by the model and the actual or known object type, the component performing the method 200 may perform a very large number of complex computations. Sufficient refinement results in an accurate model.

In some embodiments, the accuracy of the model may be checked. For example, at operation 206, the accuracy of the model is determined. This may be done by calculating the error between the model predicted object-type generated by the model and the actual object type from the data points. In some embodiments, error may also be calculated before operation 204. By calculating the accuracy or the error, the method 200 may determine if the model needs to be refined further or if the model is ready to be deployed. Where the object type is a qualitative value or a categorical value such as a vehicle, person or animal, the accuracy may be assessed based on the number of times the predicted value was correct. Where the object type is a quantitative value (e.g., an object score), the accuracy may be assessed based on the difference between the actual value and the predicted value.

At operation 208, a determination is made as to whether the calculated error is sufficiently low. A specific threshold value may be provided in some embodiments. For example, where the object characteristic is a depth, the threshold may be 0.1 meters, and the calculated error may be sufficiently low if the average error is less than or equal to 0.1 meters. However, other threshold values may be used, and the threshold value may be altered by the user in some embodiments. If the error rate is not sufficiently low, then the method 200 may proceed back to operation 202 so that one or more additional data points may be received. If the error rate is sufficiently low, then the method 200 proceeds to operation 210. Once the error rate is sufficiently low, the training phase for developing the model may be completed, and the implementation phase may begin where the model may be used to predict the expected object type.

By completing operations 202, 204, 206, and 208, a model may be refined through machine learning utilizing artificial intelligence based on the historical comparisons of additional data and sonar data and based on known deviations of the sonar data for the historical comparisons. Notably, example model generation and/or refinement may be accomplished even if the order of these operations is changed, if some operations are removed, or if other operations are added.

During the implementation phase, the model may be utilized to provide a determined object type. An example implementation of a model is illustrated from operations 210-212. In some embodiments, the model may be modified (e.g., further refined) based on the received data points, such as at operation 214.

At operation 210, further data points are received. For these further data points, the object characteristic and/or object-type may not be known. At operation 212, the model may be used to provide a predicted output data value for the further data points. Thus, the model may be utilized to determine the object type.

At operation 214, the model may be modified based on supplementary data points, such as those received during operation 210 and/or other data points. For example, the model may be refined utilizing the sonar data, additional data, and the determined object characteristics and/or object-types, such as described herein. By providing supplementary data points, the model can continuously be improved even after the model has been deployed. The supplementary data points may be the further data points received at operation 210, or the supplementary data points may be provided to the processor from some other source. In some embodiments, the processor(s) or other component performing the method 200 may receive additional data from secondary devices and verify the further data points received at operation 210 using this additional data. By doing this, the method 200 may prevent errors in the further data points from negatively impacting the accuracy of the model.

In some embodiments, supplementary data points are provided to the processor from some other source and are utilized to improve the model. For example, supplementary data points may be saved to a memory e.g., (586, 586' of FIG. 7) associated with at least one processor (e.g., 570, 570' FIG. 7) via communication interface 585, 585', or the supplementary data points may be sent through the external network 590 from a remote electronic device 540. These supplementary data points may be verified before being provided to the at least one processor 570, 570' to improve the model, or the at least one processor 570, 570' may verify the supplementary data points utilizing additional data.

As indicated above, in some embodiments, operation 214 is not performed and the method proceeds from operation 212 back to operation 210. In other embodiments, operation 214 occurs before operation 212 or simultaneous with operation 212. Upon completion, the method 200 may return to operation 210 and proceed on to the subsequent operations. Supplementary data points may be the further data points received at operation 210 or some other data points.

Example Determinations and Data Usage

As indicated herein, in some embodiments, the system may be configured to assign a score to a detected object within a sonar image, wherein the score provides an indication of the likelihood that the detected object is the same type of object as a desired object. The system may utilize object characteristics, and/or environmental characteristics as inputs for the artificial intelligence techniques described above, or the system may use the object characteristics and environmental characteristics to determine a score through other approaches, such as through an algorithmic approach.

In some embodiments, the system may be utilized to search for objects matching a desired object type (e.g., person, tire, car, watercraft) which may be in the underwater environment under the surface of the body of water. The system may be used to search the body of water and determine instances when a detected object may be the desired object type. The object score may provide an indication of the likelihood that the detected object is the same type of object as the desired object. Accordingly, the system may determine and store a corresponding location of one or more detected objects, such as where each object score indicates a high likelihood that the detected object is the same type of object as the desired object.

In some embodiments, the system may be configured to determine that an object is within the sonar data. For example, the sonar data may include various sonar signal returns that comprise an amplitude, a time of flight (e.g., time of reflection of the signal), a receipt time (e.g., when the sonar signal was received), and an angular direction (e.g., relative to the direction of the sonar, watercraft, and/or waterline). Individual sonar signal returns may be captured in memory and used to identify objects within the sonar data. In some embodiments, a cluster of similar sonar signal returns may be used to determine occurrence of an object (e.g., via the amplitude and angular direction/time of flight). In some embodiments, relative movement of a grouping of sonar signal returns across different receipt times may be used to determine an object within the sonar data. In some embodiments, additional data (e.g., automatic identification system (AIS) data, weather data, other sonar data, historical data, chart data, etc.) may be used to determine that a group of sonar signal returns correspond to an object within the sonar data.

Once the object is detected, the system may utilize additional data, including the desired object type, detected object characteristics (e.g., shape, depth, velocity of the object, etc.) and/or environmental data (e.g., water temperature, air temperature, wind, currents, etc.) to calculate an object score. For example, data points may comprise sonar data and/or other additional data (including historical data, and charts); and the data points may be provided to develop a model that may assign an object score to determine the likelihood the detected object is the same type of object as the desired object. For example, sonar data may be provided alongside other additional data such as weather data, data from maps and nautical charts, and AIS data. Then the data sets may be used to determine object characteristics that may be used to determine the object score.

In some instances, determining the score of an object may be difficult as two or more objects may be located at the same position or within the same area. For example, a tree and a fish may be represented in sonar data at the same location (e.g., depth and/or relative distance from the sonar transducer assembly). Alternatively, a fish may be located above structure. Where two or more objects are located at the same position, this may cause the sonar data presented in the display at that location to have a high intensity relative to other locations within the display. Through the use of data from different types of sonar images, data from sonar images presented over time, and additional data, the outline of objects may be determined so that two different objects may be readily distinguished. Additional data may be used alongside the available sonar data to develop and improve a model that may predict the score of each of object and distinguish between the two different types of objects. As a greater amount of data points are provided to the model, the accuracy of the model may be further improved.

In some embodiments, known historical data may be provided to help improve the model. For example, known historical data may be provided for the contours of a body of water floor or known historical data may be provided for other physical underwater structures. The sonar images taken by an unmanned device may be compared to the known data for the body of water. By providing sufficient data to the model, the model may be improved over time. Data from geographical maps and nautical charts may also be compared to the sonar data to identify new objects within the sonar data. For example, where sonar data detects an object, and that object is not found within geographical maps, nautical charts or the historical data, the model may determine that the object is new, or may be an underwater animal or some other loose object, which may impact the score of the object. Similarly, if the sonar data includes an object that is identified in one of the geographical maps, nautical charts, or historical data, the system may not include the object as a new object.

In some embodiments, the outline of the object may be detected by recognizing time-based patterns in the movement of the objects. This may be done through the use of Long Short-Term Memory ("LSTM") networks to recognize patterns in sequences of data. Where two objects are overlapping within sonar data, LSTM networks may be used to identify the movement of one object with respect to the other object. For example, when the detected object is a fish, and the fish is swimming above certain structure that is represented in sonar data in a downscan image, LSTM networks may recognize a change in the intensity of the sonar data over time and associate this changing intensity with the movement of the fish. Additionally, if enough data is retained, the outline of the fish may be known from previous sonar images where the fish and the structure do not overlap. Although here the object is described as a fish, other types of detected objects are also considered.

Other object characteristics may also be determined for various objects represented within a display. For example, the velocity or the direction that the object is heading may be determined based on (1) a comparison of previously determined locations and the most recently obtained location of the object to determine an object path of the object, wherein the locations are obtained from a source such as AIS or sonar; and/or (2) the speed of a water current at the watercraft of the user or the water current speed at the object location. Other data may also be used to determine the velocity and movement direction of the object, such as the region, the time of day and time of year, water pressure, etc.

Additional data may be provided in various forms to assist with determining different object characteristics. Additional data may include temperature data, pressure data, precipitation data, water current data, weather data, radar data, GPS data, compass data, heading sensor data, position data for a watercraft, directional data for one or more unmanned devices, directional data from a propulsion system of an unmanned device, image data from a camera, data regarding the date or time, navigational data, or geographical data. However, other types of data may also be provided. Using the additional data and various data types that are available, an accurate model may be developed. Some data types may have a negligible correlation to a specific object characteristic and may not be considered in the model. However, where a large number of data types are available, the system may beneficially find an unexpected correlation between one data type and a desired object characteristic. Thus, a large number of different data types may preferably be used.

Accordingly, in some embodiments, one or more determined object characteristics may be used to determine an object score. The object score may be calculated based on the likelihood that the detected object is the desired object type. However, the system may additionally calculate secondary scores, such as where the system calculates the likelihood that the detected object is a secondary object type. For example, the object score may be based on the likelihood the detected object is a tree, and the secondary object score may be based on the likelihood that the detected object is a vehicle. Thus, there may be secondary object scores which indicate other types of items the object could be. The determination of the object score may be performed in an algorithmic manner and/or via artificial intelligence, as discussed herein. In some embodiments, the object score may be a number from 0-100 (e.g., a percentage), with 0 being the least likely that the detected object is the desired object type and 100 indicating that the detected object is the desired object type. In some embodiments, other score indications may be used. In some embodiments, a user may confirm the object type of the detected object. In this regard, the user may provide further investigation of the detected object (e.g., through diving, imaging, etc.) and may confirm or indicate the type of object of the detected object. Thus, the model may utilize the confirmation of the type of object to correlate the object characteristics used to calculate the object score to the object type, thereby updating or increasing the accuracy of the artificial intelligence and/or the algorithm.

In some embodiments, based on the object score and optionally the secondary object score(s) an estimated object type may be determined. In this regard, the system may compare the detected objects and any associated object characteristics with historical data for other object types. Based on the comparison (e.g., object score and secondary object score(s)), the system may indicate the object type with the highest likelihood. For example, if the desired object type is a vehicle, and the object score is 30, and the secondary object scores are 72 for a tree, 22 for a tire and 4 for an animal, the system may determine the detected object is a tree.

In some embodiments, any number of object characteristics may be used, and correlation patterns of object characteristics can be utilized to determine a detected object score with reference to a desired object. In this regard, various patterns of object characteristics may lead to determination of estimated object-types. Some example object characteristics that may be determined and then utilized to determine an estimated object-type include at least one of a shape of the object, a depth of the object, an environment of the object, a velocity of the object, a temperature of the water, an intensity of the sonar data, an intensity of the additional data, a behavior of the object, a geographical area, a time of day, or a time of year. In this regard, the correlated patterns of object characteristics may lead to a determination of an estimated object-type (e.g., a type of fish) that can then be provided to the user for easy identification of objects for further investigation through a search of the area.

Example Displays, Features, and Score Calculation

FIGS. 4-6C illustrate an example display of a remote electronic device and various views that may be presented thereon. The remote electronic device may be in data communication with the unmanned device. The remote electronic device displays shown in these embodiments may assist users to be able to quickly view and synthesize information from the display for quick and accurate decisions. The remote electronic device may utilize the artificial intelligence techniques described herein to promptly and accurately provide the user with information about the body of water, the underwater environment, and the detected objects.

In some embodiments, the system may have access to an object database. The object database may store information about known objects, known bodies of water, historical data and other similar information. The object database may include a list of known objects, and corresponding example sonar images of the known objects from different underwater environments. Similarly, the object database, may comprise a specific database for each known body of water. In this regard, each known body of water may include previous sonar images of the underwater environments, where known objects, for example, the body of water floor, sunken water-crafts, underwater attractions, logs, and similar structures may be cataloged with sonar images, and location data. The object database may be used to train the artificial intelligence and/or algorithms to detect and score newly detected objects. The system may additionally inform users of previously detected objects that may not need to be searched or investigated if detected in a search.

FIG. 4 illustrates a display 341 of an example remote electronic device 340 presenting an object database 350. As discussed, the object database 350 may include known objects 1-6, sonar images, previous sonar images of underwater environments, and other similar data sets. In some embodiments, known objects may be, for example, a person 1, a log 2, a tire 3, a watercraft 4, a vehicle 5, and/or a fish 6. In some embodiments, the remote electronic device 340 may be programed with preset known objects. In some embodiments, sets of known objects may be selected based on the body of water (e.g., river, lake, ocean, bay, etc.), and/or the specific body of water to be searched. In some embodiments, each of the known objects may have one or more associated example sonar images, which may be stored in the object database. In some embodiments, as the system detects and identifies new object types, the new object types and an associated sonar image(s) may be added to the object database.

After selecting the desired object, the unmanned device may search the body of water. Upon detecting an object within the sonar image, an alert may be sent to the remote electronic device with information about the detected object. In some embodiments, in addition to the alert, an indication of the object may appear on the display of the remote electronic device. The indication may be at the location of the object on a navigational chart or may include the location of the object. In some embodiments, as the unmanned device searches the body of water, a search vessel (e.g., watercraft) may be deployed to each location of a detected object, while in other embodiments, the search vessel may be deployed to each location after completion of the search of the body of water.

FIGS. 5A-D illustrate the display 341 of the remote electronic device 340 through the deployment of the unmanned device 100. In some embodiments, the remote electronic device display 341 may present at least a navigational chart 342 and a legend 345 which provides information about the current environmental characteristics, and data about the unmanned device and search coverage.

In some embodiments, a user 315 may have a selection of choices presented within the legend 345. The legend 345, for example by utilizing coordinates or selecting points on the navigational chart, may allow the user to indicate a start point and an end point for the unmanned device 100. In other embodiments, the user may select an area of the body of water to be covered. In such embodiments, the user may highlight the area to be searched rather than relying on coordinates.

In some embodiments, the legend 345, may provide indication of known objects (see e.g., FIG. 4). The user 315 may select the desired object type for the unmanned device 100 to search for and for the system to use when scoring the detected object.

In some embodiments, the user 315 may select a pattern 347 for unmanned device to travel between the starting point and the end point, or within the area to be searched. In some embodiments, the pattern may be an "S" shape, an "M" shape, a spiral, or similar pattern which covers the entirety of the area to be searched. In some embodiments, the search pattern may allow the unmanned device to cover the entire body of water via the sonar coverage. In this regard, the sonar footprint will cover the entire bottom surface of the body of water.

The legend 345 may additionally depict the environmental factors, for example, wind speed, air temperature, water temperature, or similar. In some embodiments, the legend 345 may further indicate properties and/or characteristics of the unmanned device 100, for example, the travel velocity, direction, or similar. The legend 345 may further, in some embodiments, provide the user 315 with a selection of the type of sonar system or sonar coverage to be used with the unmanned device 100, such as, for example, down scan sonar, side scan sonar, or forward scan.

As discussed herein, the unmanned device 100 may comprise propellers (see e.g., 125 FIG. 2) to propel the unmanned device along the body of water 101. The propellers may further be utilized to overcome the environmental factors, for example wind, and/or currents, to keep the unmanned device on the selected pattern 347.

As the unmanned device 100 travels along the pattern 347, the at least one sonar transducer may emit one or more sonar beams into the underwater environment of the body of water. The system may receive sonar return data corresponding to the sonar returns emitted by the at least one sonar transducer and generate a sonar image corresponding to the sonar return data. The system may detect one or more objects within the sonar image and assign a score to each of the detected objects. The score may be an indication of the likelihood that the detected object is the desired object type. In some embodiments, the score may be based on a number of factors including one or more object characteristics detected within the sonar image, including but not limited to, the shape of the object, the intensity of the sonar return, the depth of the object, the size of the sonar return, the environment of the object (e.g., soft bottom, hard bottom, etc.), a velocity of the object, a temperature of the water, a behavior of the object, a geographical area, a time of day, and/or a time of year.

In some embodiments, in addition to assigning a score, the image containing the detected object may be compared to a sonar image in the object database containing the desired object. In such embodiments the system may provide the sonar image of the detected object, and an example sonar image of the desired object type, so a user may visually compare the two images for a user determination in addition to the score.

In some embodiments, the system may send an alert to the remote electronic device indicating the detection of an object in the underwater environment. The alert may cause the system to display a mark or otherwise indicate the detection of an object, and the location of the detected object on the display of the remote electronic device. As illustrated in FIGS. 5B-C. In some embodiments, each detected object may be indicated on the display with a marker 355. In some embodiments, the marker 355 may additionally include object information 356 which may appear on the navigational chart 342. In some embodiments, the object information 356 may include an object number (e.g., an indication of the order of detection) and the object score assigned to the detected object. Additional information about the detected object may appear in the legend 345. In some embodiments, the additional information may include the coordinates of the detected object and a breakdown of the probabilities for the object type identification. In the illustrated embodiment, the desired object may be a sunken watercraft. The first detected object has a score of 72, with a breakdown of the score into related categories. To explain, in addition to the object score, which provides an indication of the likelihood that the detected object is the desired object type, the system may provide scores which correlate the detected object to other known objects. In the illustrated example, the score and the boat score are both 72, which indicates a strong likelihood the detected object is a boat or watercraft of some type. The system additionally provided scores for a tree of 20, and a tire of 7. In this case, it is not likely that the object is a tree or a tire, however, it is more likely that the detected object is a tree than a tire. As discussed herein, the system may compare the detected object to the desired object and other known objects when calculating the probabilities.

Utilizing, for example, a side scan or down scan transducer the at least one sonar transducer may detect objects that are not in the unmanned devices immediate pattern 347 through the body of water 101. Thus, as illustrated, the system may detect objects on either side (e.g., port side or starboard side) of the unmanned device. FIG. 5C illustrates a second detected object 356 indicated by a marker 355'. The second detected object 356 includes object information indicating an object score of 50. Thus, as the score is further from 100 than the first detected object, it is more likely that the first detected object is a watercraft than the second detected object. The object information for the second detected object may also be displayed in the legend 345. The second object comprises an object score of 35 for a tree and 12 for a tire. In some embodiments, the object probabilities may be shown in rank order after the desired object.

In some embodiments, in addition to providing object information, the system may store a sonar image taken at the detection of the object. FIG. 5D illustrates, a sonar image 359 corresponding to the first detected object 356. In some embodiments, the sonar image 359 may provide visual confirmation of the detected object. Thus, the user may visually confirm the type of object of the detected object with the sonar image. In some embodiments, to improve the artificial intelligence and/or the algorithm, the user may confirm the type of object or manually override the type of object. With either method, the algorithm may update based on the users input. In some embodiments, a user may toggle between the sonar image 359 and the legend 345 by utilizing a menu 358 on the display 341.

In another example embodiment, the unmanned device may complete a search of the body of water and create a route between the detected objects with the highest likelihood of being the desired object type, as illustrated in FIGS. 6A-C. The route may be utilized by rescue personal on the body of water to investigate each of the detected objects, in the order of importance. In this regard, when searching for a person, time is of the essence and a search of the body of water must be started as soon as possible.

FIG. 6A illustrates a display 441 of a remote electronic device 440 presenting a navigational chart 442 and a legend 445. The navigational chart 442 includes indications 455a-g of detected objects. Similarly, the legend 445 includes object information corresponding to each of the detected objects. In the present example, the unmanned device may be assisting with a search and rescue, thus, the desired object may be a person, and each of the object scores may indicate the likelihood that the detected object is a person. In some embodiments, the system may order the listing of the detected objects within the legend 445 to display the detected object in a rank order, thus, the legend may display the objects with the highest scores first, and the lowest scores last.

During the search pattern, or after completion of the search pattern, the system may highlight detected objects with object scores above a threshold value. The threshold value may be a value which indicates the detected object is more likely the desired object type than any other object. Thus, in some embodiments, the threshold value may be above 50, above 60, or even above 70. To explain, in some instances, for example, searching for a vehicle, the system may have a hard time determining the difference between a car and a watercraft. Thus, the threshold value for such a search may be lower since the desired object may have an underwater presence similar to other detected objects. In contrast, when the desired object is a tire, the threshold value may be higher, as there is a more distinct profile for a tire. Similarly, in situations where the desired object is a person, the threshold value may be lower, such that any object which has the possibility of being a person is flagged and investigated.

In the illustrated embodiment, the threshold value is 50. FIG. 6B illustrates the system highlighting the detected objects where the object score is above the threshold value. In this example, the second 455b, fourth 455d, and seventh 455g object each have an object score above the threshold value. Thus, each of these objects is highlighted 435 to indicate objects above the threshold value to the user, in this case, each of the highlighted objects indicates the object may be a person.

In some embodiments, the system may provide the user an option to create a route within the legend 445, while in other embodiments, the system may automatically create a route upon completion of the search pattern. FIG. 6C illustrates, a route 437 including a starting point 438 and an ending point 439 for a searcher (e.g., user) to follow to search at and around the location of each of the detected objects defining a score above the threshold value. In this regard, rather than suggesting a direct route between the objects, the route 437 may include a pattern about each of the detected objects. The pattern may account for any environmental factors (e.g., wind, currents, etc.) or other factors which may impact the position of the detected objects within the body of water. In some embodiments, the starting point 438 of the route may be at the detected object with the highest score 455d (although the starting point may, in some embodiments, be the current location of the search vessel). The route 437 may then proceed to the object with the second highest score 455g, and end at the detected object 455b with the score closest to the threshold value.

In some embodiments, the searcher may adjust the route for efficiency, for example, if two detected objects are close together in location, but vary in scores, the user may adjust the route to search the two close objects before proceeding to the next location. Similarly, if there are other inefficiencies the user may change the order of the detected objects, and the route may update accordingly.

In some embodiments, if the detected object has a high likelihood of being the desired object type, specifically in a search and rescue operation, the remote electronic device may receive an alert indicating to the users to go to the detected object immediately, before the unmanned device has completed the search of the body of water. In such embodiments, the users may also search the body of water while the unmanned device is performing the search of the body of water.

Example System Architecture

FIG. 7 illustrates a block diagram of an example system 500 according to various embodiments of the present invention described herein. The system advantageously provides for the use of a wide variety of inputs, and these inputs may be utilized to receive data that may be used to assist in the determination of object score, or object characteristics. This also permits inputs to be provided via several different means, as devices may communicate with a processor within an unmanned device via a wireless connection, or a connection through an external network.

The illustrated system 500 includes an unmanned device 560. The system 500 may comprise numerous marine devices. As shown in FIG. 7, the system may include one or more remote electronic devices 540, and an external network 590.

One or more marine devices may be implemented on the unmanned device 560. For example, a propulsion system 582, a power source 588, a location sensor 581, a direction sensor 584, optionally a radar system 594, a sonar system 595, an autopilot 591, a position system 583, deployable equipment 587, and lights 580 may be provided within the unmanned device 560. These marine devices may be integrated within the unmanned device 560, and or otherwise connected to the unmanned device 560. The system 500 may include any number of different systems, modules, or components; each of which may comprise any device or means embodied in either hardware, software, or a combination of hardware and software configured to perform one or more corresponding functions described herein.

The unmanned device 560 may comprise at least one processor 570, a memory 586, a communication interface 585, and one or more sensors (e.g., the direction sensor 584, the location sensor 581, the position sensor 583, other sensors/systems 592). One or more of the components of the unmanned device 560 may be located within a housing or could be separated into multiple different housings (e.g., be remotely located).

The remote electronic device 540 may comprise at least one processor 570', a memory 586', a communication interface 585', a user interface 596, a display 510, and other sensors/systems 592'. One or more of the components of the remote electronic device 540 may be located within a housing or could be separated into multiple different housings (e.g., be remotely located).

The processor(s) 570, 570' may be any means configured to execute various programmed operations or instructions stored in a memory device (e.g., memory 586, 586') such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the at least one processor 570, 570' as described herein. In this regard, the at least one processor 570, 570' may be configured to analyze electrical signals communicated thereto to provide or receive sonar data from the sonar system 595 (e.g., at least one sonar transducer) and additional (e.g., secondary) data from other sources. For example, the at least one processor 570, 570' may be configured to receive sonar data and additional data, determine object characteristics, an object type for an object, and/or determine an object score.

In some embodiments, the at least one processor 570, 570' may be further configured to implement signal processing. In some embodiments, the at least one processor 570, 570' may be configured to perform enhancement features to improve the display characteristics of data or images, collect or process additional data, such as time, temperature, GPS information, waypoint designations, or others, or may filter extraneous data to better analyze the collected data. The at least one processor 570, 570' may further implement notices and alarms, such as those determined or adjusted by a user, to reflect detection of an object, to alert of an object score within a threshold score, etc.

In an example embodiment, the memory 586, 586' may include one or more non-transitory storage or memory devices such as, for example, volatile and/or non-volatile memory that may be either fixed or removable. The memory 586, 586' may be configured to store instructions, computer program code, sonar data, and additional data such as radar data, chart data, object type data, object characteristics, location/position data in a non-transitory computer readable medium for use, such as by the at least one processor 570, 570' for enabling the unmanned device 560 and the remote electronic device 540 to carry out various functions in accordance with example embodiments of the present invention. For example, the memory 586, 586' could be configured to buffer input data for processing by the at least one processor 570, 570'. Additionally or alternatively, the memory 586, 586' could be configured to store instructions for execution by the at least one processor 570, 570'.

The communication interface 585, 585' may be configured to enable communication to external systems (e.g., an external network 590, and/or remote electronic device 540). In this manner, the unmanned device 560 may retrieve stored data from a remote electronic device 540 via the external network 590 in addition to or as an alternative to the onboard memory 586, 586'. Additionally or alternatively, the unmanned device 560 may transmit or receive data, such as sonar signal data, sonar return data, sonar image data, or the like to or from the sonar system 595, which may include one or more sonar transducer assemblies. In some embodiments, the unmanned device 560 may also be configured to communicate with other devices or systems (such as through the external network 590 or through other communication networks, such as described herein). For example, the unmanned device 560 may communicate with remote electronic device 540 (e.g., a user's mobile device, a handheld remote, etc.); a second unmanned device or another system. Using the external network 590, the unmanned device may communicate with and send and receive data with external sources such as a cloud. The unmanned device 560 may send and receive various types of data. For example, the system 500 may receive weather data, data from other fish locator applications, alert data, among others. However, this data is not required to be communicated using external network 590, and the data may instead be communicated using other approaches, such as through a wireless connection via the communications interface 585, 585'.

The communications interface 585, 585' of the unmanned device 560 and the remote electronic device 540 may also include one or more communications modules configured to communicate with one another in any of a number of different manners including, for example, via a network. In this regard, the communications interface 585, 585' may include any of a number of different communication backbones or frameworks including, for example, Ethernet, the NMEA 2000 framework, GPS, cellular, Wi-Fi, or other suitable networks. The network may also support other data sources, including GPS, autopilot, engine data, compass, radar, etc. In this regard, numerous other peripheral devices (including other marine electronic devices or sonar transducer assemblies) may be included in the system 500.

The position sensor 583, the location sensor 581, and/or the direction sensor 584 may be configured to determine the current position and/or location of the unmanned device 560 (and/or the remote electronic device 540). For example, each of the position sensor 583, location sensor 581, and/or the direction sensor 584 may comprise a GPS, bottom contour, inertial navigation system, such as machined electromagnetic sensor (MEMS), a ring laser gyroscope, or other location detection system. Alternatively or in addition to determining the location of the unmanned device 560, the position sensor 583 may also be configured to determine the position and/or orientation of an object outside of unmanned device 560.

The propulsion system 582 may be configured to move the unmanned device 560 along the body of water. For example, the propulsion system may include one or more propellers (see e.g., 125 of FIG. 2) which may cause the unmanned device 560 to move along the route. The propulsion system 582 may in some embodiments, (e.g., through the processor) be in data communication with the direction sensor 584, the position sensor 583, and/or the location sensor 581. In this regard, the propulsion system 582 may utilize the other sensors to stay on route.

The camera 593 may be configured to take images of the location of and/or environment of the unmanned device 560. For example, in some embodiments, the camera 593 may be a waterproof camera, or an underwater camera. The camera 593, may provide images to the remote electronic device, for example, through the communication interface 585.

The power source 588 may be configured to provide power to the unmanned device 560. For example, in some embodiments, the power source may be a battery. The battery may be chargeable through a wired connection, or through utilizing renewable energy sources (e.g., solar, wind, etc.).

The deployable equipment 587 may be configured to deploy from the unmanned device under certain circumstances. In some embodiments, the deployable equipment 587 may be a flotation device, a flare or other indication beacon, or similar. The deployable equipment 587 may be retained within the unmanned device 560 until the processor 570 receives an indication to deploy the deployable equipment 587. In some embodiments, the indication to deploy the deployable equipment may be upon determining a score is within a threshold value.

The unmanned device 560 may be in communication with the remote electronic device 540 of the system 500. The remote electronic device 540 may provide data and updates about the unmanned device 560. In some embodiments, the remote electronic device 540 may be configured to send and/or receive instructions from the unmanned device 560. For example, the remote electronic device 540, as through the processor 570' and the communication interface 585' may send instructions to the unmanned device 560 to change route, deploy the deployable equipment 587, or similar.

The display 510 (e.g., one or more screens) may be configured to present images and may include or otherwise be in communication with a user interface 596 configured to receive input from a user. The display 510 may be, for example, a conventional LCD (liquid crystal display), a touch screen display, mobile device, or any other suitable display known in the art upon which images may be displayed.

In some embodiments, the display 510 may present one or more sets of data (or images generated from the one or more sets of data). Such data includes chart data, radar data, sonar data, weather data, location data, position data, orientation data, sonar data, or any other type of information relevant to the watercraft. Sonar data may be received from one or more sonar systems 595 or from sonar devices positioned at other locations, such as remote from the unmanned device 560. Additional data may be received from marine devices such as a radar system 594 or an associated sensor, a propulsion system 582 or an associated sensor, an autopilot, a position sensor 583, a direction sensor 584, a location sensor 581, other sensors 592, memory 586, 586' (e.g., stored chart data, historical data, etc.), or other devices.

In some further embodiments, various sets of data, referred to above, may be superimposed or overlaid onto one another. For example, a route may be applied to (or overlaid onto) a chart (e.g. a map or navigational chart). Additionally or alternatively, depth information, weather information, radar information, sonar information, or any other navigation system inputs may be applied to one another.

The user interface 596 may include, for example, a keyboard, keypad, function keys, mouse, scrolling device, input/output ports, touch screen, or any other mechanism by which a user may interface with the system.

Although the display 510 of FIG. 7 is shown as being directly connected to the at least one processor 570' and within the remote electronic device 540, the display 510 could alternatively be remote from the at least one processor 570' and/or remote electronic device 540.

The unmanned device 560 may include one or more other sensors/devices 592, such as configured to measure or sense various other conditions. The other sensors/devices 592 may include, for example, an air temperature sensor, a water temperature sensor, a current sensor, a light sensor, a wind sensor, a speed sensor, or the like.

The sonar system 595 illustrated in FIG. 7 may include one or more sonar transducer elements, such as may be arranged to operate alone or in one or more transducer arrays. In some embodiments, additional separate sonar transducer elements (arranged to operate alone, in an array, or otherwise) may be included. As described herein, the sonar transducer assemblies may also include a sonar signal processor or other processor (although not shown) configured to perform various sonar processing. In some embodiments, the processor (e.g., at least one processor 570, 570' in the unmanned device 560, or the remote electronic device 540, a controller (or processor portion) in the sonar transducer assemblies, or a remote controller—or combinations thereof) may be configured to filter sonar return data and/or selectively control transducer element(s). For example, various processing devices (e.g., a multiplexer, a spectrum analyzer, A-to-D converter, etc.) may be utilized in controlling or filtering sonar return data and/or transmission of sonar signals from the transducer element(s).

The sonar system 595 may also include one or more other systems, such as various sensor(s). For example, the sonar system 595 may include an orientation sensor, such as gyroscope or other orientation sensor (e.g., accelerometer, MEMS, etc.) that can be configured to determine the relative orientation of the sonar transducer assembly and/or the one or more sonar transducer element(s)—such as with respect to a forward direction of the watercraft. In some embodiments, additionally or alternatively, other types of sensor(s) are contemplated, such as, for example, a water temperature sensor, a current sensor, a light sensor, a wind sensor, a speed sensor, or the like.

The components presented in FIG. 7 may be rearranged to alter the connections between components. For example, in some embodiments, a device outside of the unmanned device 560, such as the remote electronic device 540, may be directly connected to the at least one processor 570 rather than being connected to the communication interface 585. Additionally, sensors and devices implemented within the unmanned device 560 may be directly connected to the communications interface in some embodiments rather than being directly connected to the at least one processor 570.

In some embodiments, more than one unmanned device may be deployed to search the body of water. FIG. 8 illustrates a block diagram of system 500' according to some embodiments discussed herein. The illustrated system 500' includes a first unmanned device 560a and a second unmanned device 560b. Each of the unmanned devices 560a, 560b, may comprise the one or more marine devices as discussed with reference to FIG. 7. Although two unmanned devices are discussed, any number of unmanned devices are considered. The system further comprises the remote electronic device 540, which includes the communication interface 585'.

Each of the first unmanned device 560a, the second unmanned device 560b, the remote electronic device 540 and the external network 590 may be in data communication, for example via communication interfaces. In this regard, each of the first unmanned device 560a and the second unmanned device 560b may search distinct areas of the body of water, thereby decreasing the amount of time to perform a search of the entire area.

Example Flowchart(s) and Operations

Some embodiments of the present invention provide methods, apparatus, and computer program products related to the presentation of information in a display according to various embodiments described herein. Various examples of the operations performed in accordance with embodiments of the present invention will now be provided with reference to FIGS. 9-11, which present various flowcharts with example methods of detecting one or more objects in an underwater environment and providing an alert or indication to the user of the type of object detected. These methods may be performed by a wide variety of components, including, but not limited to, one or more processors, one or more microprocessors, and one or more controllers. In some embodiments, an unmanned device (e.g., 560 FIG. 7) or a remote electronic device (e.g., 540 FIG. 7) may comprise one or more processors that perform the functions shown in FIGS. 9-11. Further, these methods may be provided on a piece of software which runs on a central server that is at a remote location away from the watercraft, and the remote server may communicate with a processor or a similar component on the watercraft. Additionally, the methods could be integrated into a software update that may be installed onto existing hardware, or the methods may be integrated into the initial software or hardware provided in a radar unit, watercraft, server, etc. By performing these methods, the displays may present information in a readily understandable manner, with object characteristics clearly provided.

FIG. 9 is a flowchart of an example method 600 for providing an alert to a user of the location of a detected object, in accordance with some embodiments discussed herein. At operation 602, an unmanned device is deployed. The unmanned device may be deployed from a dock, a watercraft, or shore of a body of water. At operation 604, sonar beams are emitted. The sonar beams may be emitted from one or more sonar transducers associated with the unmanned device. In some embodiments, the sonar beams may correspond to a down scan transducer, a side scan transducer, a forward scan transducer, or similar. At operation 606, sonar returns are received. At operation 608, one or more objects is detected in the sonar returns. In some embodiments, the sonar returns may be utilized to generate a sonar image. The sonar image may be analyzed by artificial intelligence or an algorithm to detect objects within the sonar image. At operation 610, the detected object is scored. The score may be calculated by artificial intelligence and/or an algorithm, and the score may be used to inform a user of the likelihood that the detected object is the same object type as a desired object. At operation 612, an alert may be sent to the user of the location of the detected object. The alert may be an auditory alert in some embodiments and may be a visual alert on a display or navigational chart in other embodiments.

FIG. 10 illustrates a flowchart of an example method 700 for presenting an indication of a detected object to a user. At operation 702, sonar data is received. As discussed, the sonar data may correspond to sonar beams emitted from one or more sonar transducers associated with the unmanned device. At operation 704, additional data may be received from a data source other than a sonar transducer. In this regard, the data source may be a GPS, a weather database, a historical data base, or similar. At operation 706, object characteristics may be determined using the sonar data and the additional data. In this regard, the object characteristics may be used by artificial intelligence and/or an algorithm to determine the type of object, or compare the detected object to a desired object. At operation 708, an estimated object type may be determined. The estimated object type may be based on the object characteristics detected within the sonar return data and the additional data. At operation 710, a sonar image based on the sonar data may be generated. At operation 712, presentation of the sonar image. The sonar image may be presented on a display of a remote electronic device (e.g., 540 FIG. 7) or similar. At operation 714, the detected object may be highlighted within the sonar image. In some embodiments, the highlight may be an indication of the object, such as, for example, an arrow.

FIG. 11 illustrates a flowchart of an example method 800 for creating a search route. At operation 802, one or more sonar beams are emitted into an underwater environment. As discussed, the one or more sonar beams may be emitted from one or more sonar transducers associated with an unmanned device. At operation 804, sonar returns are received. At operation 806, a first object is detected within the sonar returns. At operation 808, the first object is scored. As discussed, the score may be calculated by artificial intelligence or an algorithm, wherein the score indicates a likelihood that the detected object is the same type of object as the desired object. At operation 810, a second object is detected within the sonar image. At operation 812, the second object is scored. At operation 814, a route is created between the first object and the second object. As discussed, the route may begin at the object with the highest score and may include the location where the object was detected, and, in some cases, a surrounding area.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed:

1. An unmanned device for a marine environment, wherein the unmanned device is configured to travel upon a surface of a body of water, the unmanned device comprising:
   a location sensor configured to gather location data corresponding to the unmanned device;
   at least one propulsion system configured to propel the unmanned device;
   at least one sonar transducer, wherein the at least one sonar transducer is configured to emit one or more sonar beams into an underwater environment of the body of water from the unmanned device;
   a transmitter configured to transmit data to a remote electronics device;
   a processor; and
   a memory including computer program code, the computer program code configured to, when executed, cause the processor to:
      cause the at least one propulsion system to propel the unmanned device in a pattern along the body of water;
      cause the at least one sonar transducer to emit the one or more sonar beams into the body of water;
      receive sonar return data corresponding to sonar returns received by the at least one sonar transducer;
      generate a sonar image corresponding to the sonar return data;
      detect one or more objects within the sonar image;
      compare, utilizing a model developed through artificial intelligence, the detected one or more objects to one or more stored object types of a plurality of object types in an object database to determine an object type for the detected one or more objects, wherein the model is formed based on historical comparisons of a historical object-type with historical sonar data and historical additional data;
      assign, based at least on the comparison, a score to the one or more objects, wherein the score provides an indication of the likelihood that the one or more objects is a desired object type; and
      send an alert to the remote electronics device upon assignment of the score.

2. The unmanned device of claim 1, wherein the at least one sonar transducer is towed by the unmanned device.

3. The unmanned device of claim 1, wherein the at least one sonar transducer is positioned below a surface of the body of water.

4. The unmanned device of claim 1, wherein the score is determined from the sonar data and one or more object characteristics, wherein the one or more object characteristics comprises at least one of a shape of an object, a depth of the object, an environment of the object, a velocity of the object, a temperature of the body of water, a behavior of the object, a geographical area, a time of day or a time of year.

5. The unmanned device of claim 1, wherein the object database further comprises sonar images of the underwater environment.

6. The unmanned device of claim 5, wherein the sonar images of the underwater environment include one or more previously detected objects, and location data associated with the previously detected objects.

7. The unmanned device of claim 1, further comprising a receiver, wherein the receiver is configured to receive instructions from the remote electronics device.

8. The unmanned device of claim 1, wherein the at least one propulsion system is configured to correct for environmental factors.

9. The unmanned device of claim 1, wherein the alert includes the location data associated with the detected object.

10. A method of identifying objects in an underwater environment, the method comprising:
   deploying an unmanned device to a body of water, the unmanned device comprising:
      a location sensor configured to gather location data corresponding to the unmanned device;
      at least one propulsion system configured to propel the unmanned device along the body of water;
      a transmitter configured to transmit data to a remote electronics device; and
      at least one sonar transducer, wherein the at least one sonar transducer is configured to emit one or more sonar beams into the underwater environment of the body of water from the unmanned device;
   causing the at least one propulsion system to propel the unmanned device in a pattern along the body of water;
   causing the at least one sonar transducer to emit the one or more sonar beams into the underwater environment;
   receiving sonar return data corresponding to sonar returns received by the at least one sonar transducer;
   generating a sonar image corresponding to the sonar return data;
   determining a desired object type;
   detecting at least one object within the sonar image;
   comparing, utilizing a model developed through artificial intelligence, the detected one or more objects to one or more stored object types of a plurality of object types in an object database to determine an object type for the detected one or more objects, wherein the model is formed based on historical comparisons of a historical object-type with historical sonar data and historical additional data;
   assigning, based on the comparison, a score to the one or more objects detected within the sonar image, wherein the score is an indication of the likelihood that the at least one object is the desired object type; and
   sending an alert to the remote electronic device, when the score is above a threshold value.

11. The method of claim 10, wherein the score is determined from the sonar data and one or more object characteristics, wherein the one or more object characteristics comprise at least one of a shape of the object, a depth of the object, an environment of the object, a velocity of the object, a temperature of the body of water, a behavior of the object, a geographical area, a time of day or a time of year.

12. The method of claim 10, wherein the object database further comprises sonar images of the underwater environment.

13. The method of claim 12, wherein the sonar images of the underwater environment include one or more previously detected objects, and location data associated with the previously detected objects.

14. The method of claim 10, wherein the alert includes the location data associated with the detected object.

15. The method of claim 10, wherein the unmanned device further comprises a receiver, and wherein the method further comprises receiving at least one instruction from the remote electronics device.

16. A system for determining an identity of an object in an underwater environment, the system comprising:

a remote electronics device;

an unmanned device, wherein the unmanned device is in data communication with the remote electronics device, the unmanned device comprising:

a location sensor configured to gather location data corresponding to the unmanned device;

at least one propulsion system configured to propel the unmanned device;

at least one sonar transducer, wherein the at least one sonar transducer is configured to emit one or more sonar beams into an underwater environment of the body of water from the unmanned device;

a transmitter configured to transmit data to the remote electronics device;

a processor; and a memory including computer program code, the computer program code configured to, when executed, cause the processor to:

cause the at least one propulsion system to propel the unmanned device in a pattern along the body of water;

cause the at least one sonar transducer to emit the one or more sonar beams into the body of water;

receive sonar return data corresponding to sonar returns received by the at least one sonar transducer;

generate a sonar image corresponding to the sonar return data;

detect one or more objects within the sonar image;

compare, utilizing a model developed through artificial intelligence, the detected one or more objects to one or more stored object types of a plurality of object types in an object database to determine an object type for the detected one or more objects, wherein the model is formed based on historical comparisons of a historical object-type with historical sonar data and historical additional data;

assign, based on the comparison, a score to the one or more objects, wherein the score provides an indication of the likelihood that the one or more objects is a desired object type; and send an alert to the remote electronics device upon assignment of the score.

17. The system of claim 16, wherein the score is determined from the sonar data and one or more object characteristics, wherein the one or more object characteristics comprises at least one of a shape of an object, a depth of the object, an environment of the object, a velocity of the object, a temperature of the water, a behavior of the object, a geographical area, a time of day or a time of year.

18. The system of claim 16, wherein the object database comprises distinct object data for each of the plurality of object types.

* * * * *